US011243571B2

(12) United States Patent
Zuo

(10) Patent No.: US 11,243,571 B2
(45) Date of Patent: Feb. 8, 2022

(54) ELECTRONIC DEVICE

(71) Applicant: GUANGDONG OPPO MOBILE TELECOMMUNICATIONS CORP., LTD., Guangdong (CN)

(72) Inventor: Zhouquan Zuo, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/691,288

(22) Filed: Nov. 21, 2019

(65) Prior Publication Data

US 2020/0209924 A1 Jul. 2, 2020

(30) Foreign Application Priority Data

Dec. 29, 2018 (CN) .......................... 201811641857.6

(51) Int. Cl.
 *G06F 3/041* (2006.01)
 *G06F 1/16* (2006.01)
 *G06F 3/14* (2006.01)
 *H02J 7/00* (2006.01)
 *H02J 7/02* (2016.01)

(52) U.S. Cl.
 CPC ............ *G06F 1/1652* (2013.01); *G06F 3/041* (2013.01); *G06F 3/1423* (2013.01); *G06F 2203/04102* (2013.01); *G06F 2203/04104* (2013.01); *H02J 7/0042* (2013.01); *H02J 7/025* (2013.01)

(58) Field of Classification Search
 CPC ......... G06F 1/1652; G06F 2203/04102; G06F 3/041; G06F 3/1423; G06F 2203/04104; G06F 1/1645; G06F 1/1686; G06F 1/3265; G06F 1/3212; G06F 2203/04803; G06F 3/04883; H04M 1/0268; H04M 1/0237; H02J 7/0042; H02J 7/025; Y02D 10/00
 See application file for complete search history.

(56) References Cited

U.S. PATENT DOCUMENTS

2012/0212433 A1 8/2012 Lee et al.
2014/0213324 A1 7/2014 Tan et al.
(Continued)

FOREIGN PATENT DOCUMENTS

CN 201185067 1/2009
CN 101394433 3/2009
(Continued)

OTHER PUBLICATIONS

EPO, Office Action for EP Application No. 19214923.5, dated May 8, 2020.
(Continued)

*Primary Examiner* — Temesghen Ghebretinsae
*Assistant Examiner* — Karin Kiyabu
(74) *Attorney, Agent, or Firm* — Hodgson Russ LLP

(57) ABSTRACT

The embodiment of the present disclosure provides an electronic device including a main body, a flexible screen, and a processor, the main body being a reel structure; the flexible screen being selectively in a first state wound inside the main body and a second state being released from the main body, the processor being configured to control the flexible screen to be changed between the first state and the second state in response to operation instructions applied on the main body or the flexible screen.

19 Claims, 23 Drawing Sheets

(56) References Cited

U.S. PATENT DOCUMENTS

| | | | |
|---|---|---|---|
| 2014/0362512 A1 | 12/2014 | Hinson | |
| 2015/0189175 A1* | 7/2015 | Fan | H04N 5/23238 |
| | | | 348/37 |
| 2015/0340004 A1 | 11/2015 | Pang | |
| 2016/0210041 A1* | 7/2016 | Yang | G06F 3/04842 |
| 2016/0307545 A1* | 10/2016 | Lee | G09G 3/2003 |
| 2017/0196102 A1* | 7/2017 | Shin | H05K 5/0017 |
| 2017/0212556 A1* | 7/2017 | Jovanovic | G06F 1/1652 |
| 2017/0262123 A1* | 9/2017 | Horikoshi | G06F 1/1643 |
| 2018/0014415 A1 | 1/2018 | Choi et al. | |
| 2018/0348881 A1* | 12/2018 | Chung | G06F 3/04883 |
| 2019/0042014 A1* | 2/2019 | Ohata | G06F 3/0481 |
| 2019/0236988 A1* | 8/2019 | Lin | G09F 9/30 |
| 2019/0327350 A1* | 10/2019 | Li | G06F 1/1652 |

FOREIGN PATENT DOCUMENTS

| | | | |
|---|---|---|---|
| CN | 106205390 | | 12/2016 |
| CN | 106205390 A | * 12/2016 | ........... G06F 1/1652 |
| CN | 107067981 | | 8/2017 |
| CN | 107221254 | | 9/2017 |
| CN | 206850821 | | 1/2018 |
| CN | 107731158 | | 2/2018 |
| CN | 108064368 | | 5/2018 |
| CN | 108234769 | | 6/2018 |
| CN | 108538201 | | 9/2018 |
| CN | 108877532 | | 11/2018 |
| CN | 109788092 | | 5/2019 |
| EP | 3001650 | | 3/2016 |

OTHER PUBLICATIONS

SIPO, First Office Action for CN Application No. 201811641857.6, dated Apr. 23, 2020.

WIPO, English translation of the ISR and WO for PCT/CN2019/111762, dated Jan. 6, 2020.

CNIPA, Office Action for CN Application No. 201811641857.6, dated Jun. 2, 2021.

EPO, Communication for EP Application No. 19214923.5, dated Jun. 2, 2021.

IPI, Office Action for IN Application No. 201914048174, dated Jul. 13, 2021.

* cited by examiner

ELECTRONIC DEVICE

CROSS-REFERENCE TO RELATED APPLICATION

This application claims priority to Chinese Patent Application No. 201811641857.6, filed on Dec. 29, 2018, the entire disclosure of which is incorporated herein by reference.

TECHNICAL FIELD

The present disclosure relates to the field of electronic technologies, and in particular, to an electronic device.

BACKGROUND

With the development of communication technologies, electronic devices such as smart phones are becoming more and more popular. Electronic devices are usually flat and severely identifiable. With the increasing diversification of electronic devices, the overall structure of existing electronic devices has been unable to meet the needs of different users to meet the needs of different users.

SUMMARY

The embodiments of the present disclosure provide an electronic device, which may improve the diversity of electronic device configurations.

In a first aspect, an embodiment of the present disclosure provides an electronic device, the electronic device includes a main body, a flexible screen, and a processor, the main body being a reel structure; the flexible screen being selectively in a first state wound inside the main body and a second state being released from the main body, the processor being configured to control the flexible screen to be changed between the first state and the second state in response to operation instructions applied on the main body or the flexible screen.

In a second aspect, an embodiment of the present disclosure further provides an electronic device, the electronic device includes a main body, a function module and a processor, the main body including a reel structure, the function module being disposed at the main body to implement signal transmission between the electronic device and the external; the processor being configured to control the function module to move along a circumferential direction of the main body to implement a 360-degree circular signal transmission along the circumferential direction.

In a third aspect, an embodiment of the present disclosure further provides an electronic device, the electronic device includes a main body and a flexible screen, the main body includes a cylindrical surface, wherein a slit is defined in the cylindrical surface, the slit is extended along a central axis of the cylindrical surface; the flexible screen is capable of reeling inside and released from the main body via the slit.

BRIEF DESCRIPTION OF THE DRAWINGS

In order to more clearly illustrate the technical solutions in the embodiments of the present disclosure, the drawings used in the description of the embodiments will be briefly described below.

DETAILED DESCRIPTION

Figure 1:
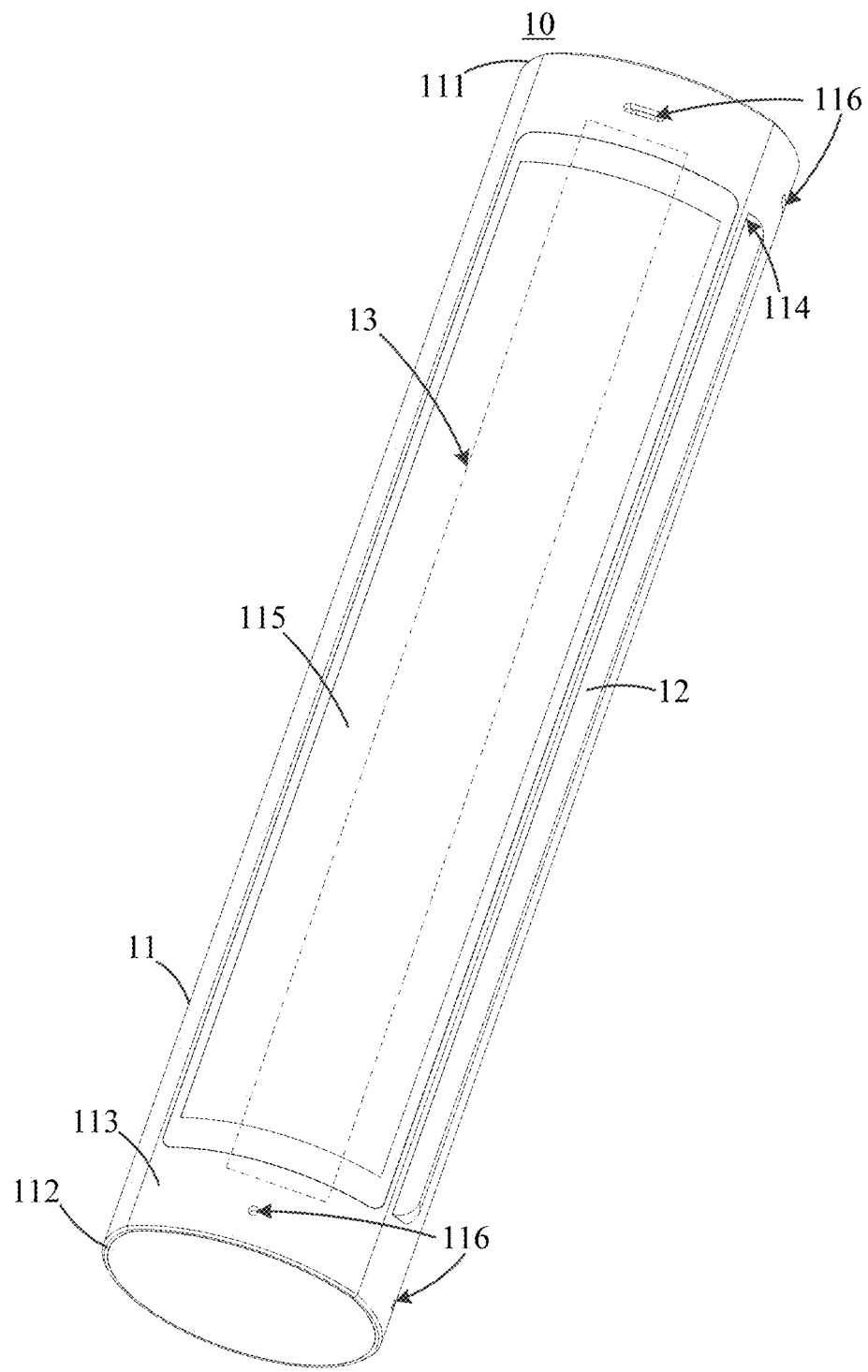
FIG. 1 illustrates a first perspective view of an electronic device according to an embodiment of the present disclosure.

FIG. 1 illustrates a first perspective view of an electronic device according to an embodiment of the present disclosure. The electronic device 10 may be a computing device such as a laptop computer, a computer monitor including an embedded computer, a tablet, a cellular telephone, a media player, or other handheld or portable electronic device, a smaller device (such as a wristwatch device, hanging device, earphone or earpiece device, device embedded in the eyeglass or other device worn on the user's head, or other wearable or micro device), a television, a computer display without embedded computer, a gaming device, a navigation device, an embedded system (such as a system in which an electronic device having a display is installed in a kiosk or car), a device that implements the functions of two or more of these devices, or other electronic devices. In the exemplary configuration of FIG. 1, the electronic device 10 is a portable device, such as a cellular telephone, media player, tablet, or other portable computing device. Other configurations are available to the electronic device 10, if desired. FIG. 1 is merely an example.

As shown in FIG. 1, the electronic device 10 may include a main body 11, which may serve as a carrier for the electronic device 10 and may sometimes be referred to as a housing. The main body 11 may be formed of plastic, glass, ceramic, fiber composite, metal (e.g., stainless steel, aluminum, etc.), other suitable materials, or a combination of any two or more of these materials. Among them, the metal is, for example, an aluminum alloy, a magnesium alloy, a magnesium aluminum alloy, or a stainless steel.

Figure 2:
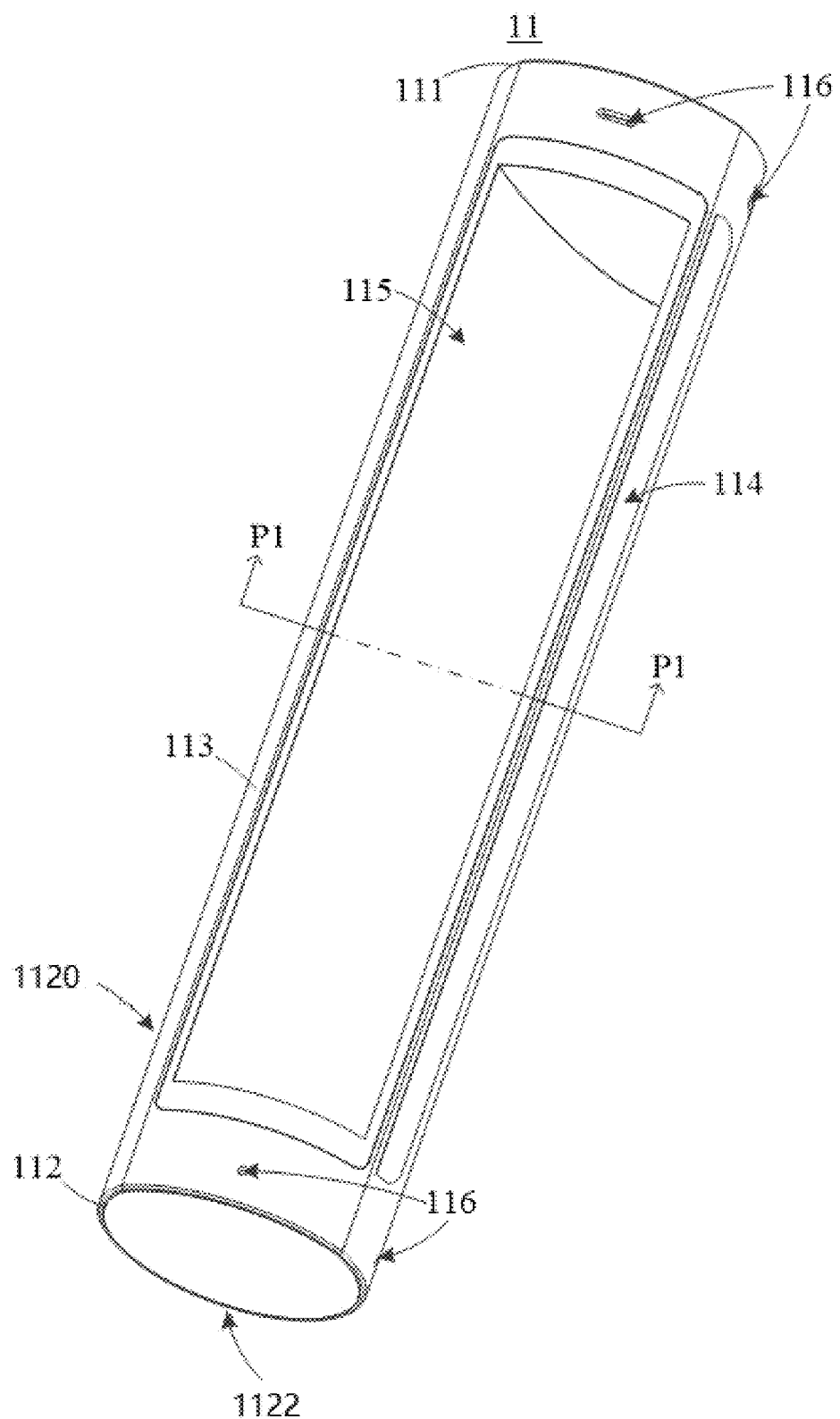
FIG. 2 illustrates a schematic structural diagram of a main body in an electronic device according to an embodiment of the present disclosure.

FIG. 2 illustrates a schematic structural diagram of a main body in an electronic device according to an embodiment of the present disclosure. The main body 11 may form an outer contour of the electronic device 10, and the main body 11 may have a regular shape, for example, the main body 11 may be a reel structure having a cylindrical surface 1120 and two circular end surface 1122. In other embodiments, the main body 11 may have a circular platform structure, a cone structure, a polyhedral structure, or the like. The main body 11 may also have an irregular shape.

Figure 3:
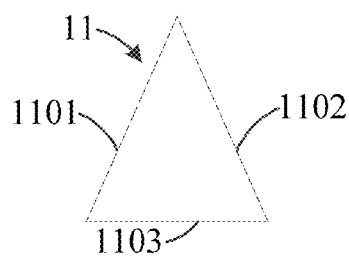
FIG. 3 illustrates a first cross-sectional view of the main body of FIG. 2 taken along a line P1-P1.

FIG. 3 illustrates a first cross-sectional view of the main body of FIG. 2 along the line P1-P1. The polygon formed by the cross-sectional view of the main body 11 along the cross-sectional line P1-P1 may be a triangle, a quadrangle, a pentagon or a hexagon. At least two sides of the polygon may be equal. For example, the first cross-sectional view of the main body 11 in the B-B direction or the C-C direction forms a triangle. Two of the sides of the triangle are substantially equal, and the triangle includes a first side 1101, a second side 1102, and a third side 1103 that are sequentially connected. The length of the first side 1101 and the length of the second side 1102 are equal, and the length of the third side 1103 is different from the length of the first side 1101 and the length of the second side 1102, respectively. For example, two of the sides of the quadrilateral are substantially equal or three of the sides are substantially equal.

Figure 4:
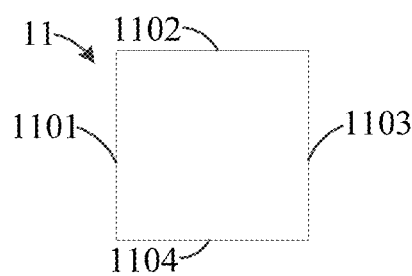
FIG. 4 illustrates a second cross-sectional view of the main body of FIG. 2 taken along the line P1-P1.

FIG. 4 illustrates a second cross-sectional view of the main body of FIG. 2 along the line P1-P1. The polygons may be a square, and the square includes a first side 1101, a second side 1102, a third side 1103, and a fourth side 1104.

Figure 5:
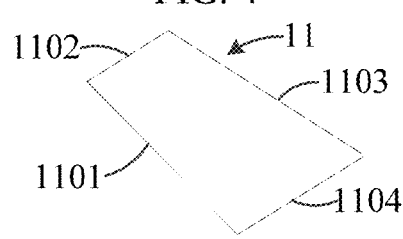
FIG. 5 illustrates a third cross-sectional view of the main body of FIG. 2 taken along the line P1-P1.

FIG. 5 illustrates a third cross-sectional view of the main body of FIG. 2 along the line P1-P1. The third section of the main body 11 along the section line P1-P1 forms a polygon, the polygon may not be a regular polygon, and each side of the polygon may also be unequal. For example, the polygon includes a first side 1101, a second side 1102, a third side 1103, and a fourth side 1104, which are sequentially connected and have different lengths.

Figure 6:
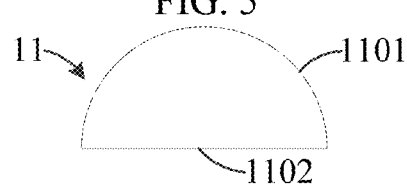
FIG. 6 illustrates a fourth cross-sectional view of the main body of FIG. 2 taken along the line P1-P1.

FIG. 6 illustrates a fourth cross-sectional view of the main body 11 of FIG. 2 along the line P1-P1. The cross-sectional view of the main body 11 in the direction of the cross-sectional line P1-P1 may further form other shapes, and the cross-sectional view of the main body 11 in the direction of the cross-sectional line P1-P1 forms at least two sides including at least one curved side and at least one straight side. For example, the cross-sectional view of the main body 11 along the section line P1-P1 forms two sides, including a first side 1101 and a second side 1102. The first side 1101 is curved. The second side 1102 is straight. The second side 1102 and the first side 1101 are connected.

Figure 7:
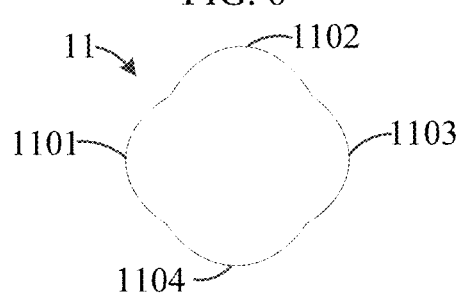
FIG. 7 illustrates a fifth cross-sectional view of the main body of FIG. 2 taken along the line P1-P1.

FIG. 7 illustrates a fifth cross-sectional view of the main body of FIG. 2 taken along the line P1-P1. The cross-sectional view of the main body 11 taken along the cross-sectional line P1-P1 may further form other shapes, and the cross-sectional view of the main body 11 in the direction of the cross-sectional line P1-P1 forms at least two sides, at least two of which are curved sides. For example, the shape formed by the cross-sectional view of the main body 11 along the section line P1-P1 includes four curved sides, that is, a first side 1101, a second side 1102, a third side 1103, and a fourth side 1104, which are sequentially connected.

As shown in FIG. 2, the main body 11 includes at least one end and at least one side. For example, the main body 11 may have a first end 111, a second end 112, and a first side portion 113. The first end 111 and the second end 112 are oppositely disposed in longitudinal direction of the main body, and the first side portion 113 is disposed between the first end 111 and the second end 112.

The circumference direction of the main body 11 is a direction surrounding the first side portion 113, and the axial direction of the main body 11 is a direction along the first end portion 111 toward the second end portion 112. The axial direction of the main body 11 is perpendicular to the circumference direction of the main body 11.

The first end 111, the second end 112, and the first side portion 113 form an inner casing 21 in the main body 11, and the receiving cavity 1122 may accommodate elements of the electronic device 10, such as a flexible screen, a roller, a motherboard and a battery. In this embodiment, the flexible screen may be further a touch screen.

The first end 111 or the second end 112 may be used as a bottom surface of the electronic device 10 in a standing state. For example, the first end 111 may be a plane, which makes the electronic device standing up stably. In other embodiments, the first end 111 may be a surface of which a central portion is recessed toward the internal of the electronic device 10. In other embodiments, the first end 111 may be other shape, like a tip shape, or the like, which would not assist the electronic device 10 to stand up.

The first end 111 and the second end 112 may be arranged in parallel or not. The size of the first end 111 and the size of the second end 112 may be the same size or not.

The first side 113 may have a cylindrical shape or a conical shape, and the first side portion 113 may have at least two interconnected surfaces. When the first side portion 113 includes two mutually connected surfaces, the first side portion 113 may include at least one curved surface, for example, a curved surface and a flat surface. When the first side portion 113 has at least three mutually connected surfaces, all surfaces of the first side portion 113 may be curved surfaces or be a plane.

Figure 8:
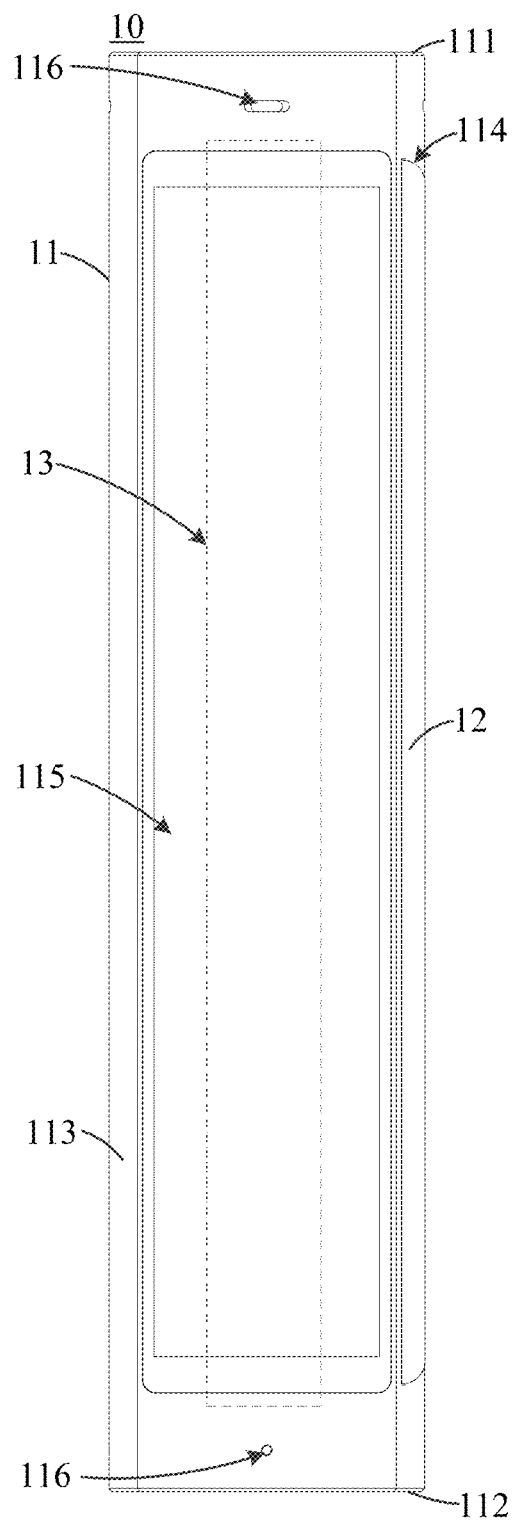
FIG. 8 illustrates a first schematic diagram of an electronic device in a standing state according to an embodiment of the present disclosure.

FIG. 8 illustrates a first schematic diagram of an electronic device in a standing state according to an embodiment of the present disclosure. The electronic device 10 erects with the first end 111 being a bottom. The length of the first side portion 113 is greater than the diameter of the first end 111, or the second end 112. The area of the first side portion 113 is larger than the area of the first end portion 111 or the second end portion 112.

The first side portion 113 of the main body 11 is provided with a slit 114. The slit 114 may penetrate the first side portion 113. The slit 114 has a strip shape, and the slit 114 may be formed between the first end 111 and the second end 112. The slit 114 is used for the flexible screen 12 to be reeled inside the main body 11 or released from the main body 11. In this embodiment, the first side portion 113 includes a cylindrical surface 1120, the slit 114 is defined in the cylindrical surface 1120, and the slit 114 is extended along a central axis of the cylindrical surface 1120.

The first side portion 113 of the main body 11 is provided with a light transmitting region 115. The light transmitting region 115 may be formed by a window opened on the first side portion 113, which may penetrate the first side portion 113. The light transmitting region 115 may also be formed of a transparent material on the first side portion 113, and the light transmitting region 115 may also be formed of a transparent cover such as a glass cover plate disposed on the first side portion 113. The inside of the electronic device 10 may be seen through the light transmitting region 115 from the outside of the electronic device 10. The first slit 114 and the light transmitting area 115 may be disposed at intervals.

The main body 11 is provided with at least one transmitting portion 116 for transmitting signals such as optical signals or acoustic signals. The transmitting portion 116 may be a through hole or a transparent structure.

Illustratively, the at least one transmission portion 116 may be disposed on the first side portion 113 and adjacent to the first end 111 or the second end 112. The acoustic signal may be transmitted in one direction or in multiple directions through the transmitting portion 116 adjacent to the first end 111 or the second end 112, such as transmitting the acoustic signals between the electronic device 10 and the external.

As shown in FIGS. 1 and 8, the electronic device 10 may include a flexible screen 12. The flexible screen 12 may be fixed in the main body 11, which can be housed within the main body 11 by reeling, or release from the main body 11 for display. Within the main body 11, the flexible screen 12 may still display or not.

Illustratively, in the first state, the flexible screen 12 is reeled in or say wound inside the main body 11. In the second state, the flexible screen 12 is released from the main body 11 through the slit 114 by a driving force. The driving force may be an external force, such as a manual action by a user. The driving force may also be generated by a driving mechanism of the electronic device 10. In other embodiments, the flexible screen 12 may be in a folded state.

The flexible screen 12 may be made of a flexible material that may be deformed. For example, a flexible display may be bent, and the like. The flexible screen 12 may be housed in the main body 11, as shown in FIGS. 1 and 8. One end of the flexible screen 12 may be exposed and remained at the slit 14, and the other end of the flexible screen 12 may be fixed inside the main body 11.

The flexible screen 12 may be a touch screen display incorporating a conductive capacitive touch sensor electrode layer or other touch sensor component (e.g., a resistive touch sensor component, an acoustic touch sensor component, a force-based touch sensor component, a light-based touch sensor component, etc.), or it may be anon-touch sensitive flexible display. The capacitive touch screen electrodes may be formed from indium tin oxide pads or other arrays of transparent conductive structures.

In some embodiments, when the flexible screen 12 is housed within the main body 11, the flexible screen 12 may be displayed through light transmitting region 115. For example, a portion of the flexible screen 12 is located facing the light-transmitting region 115.

Figure 9:
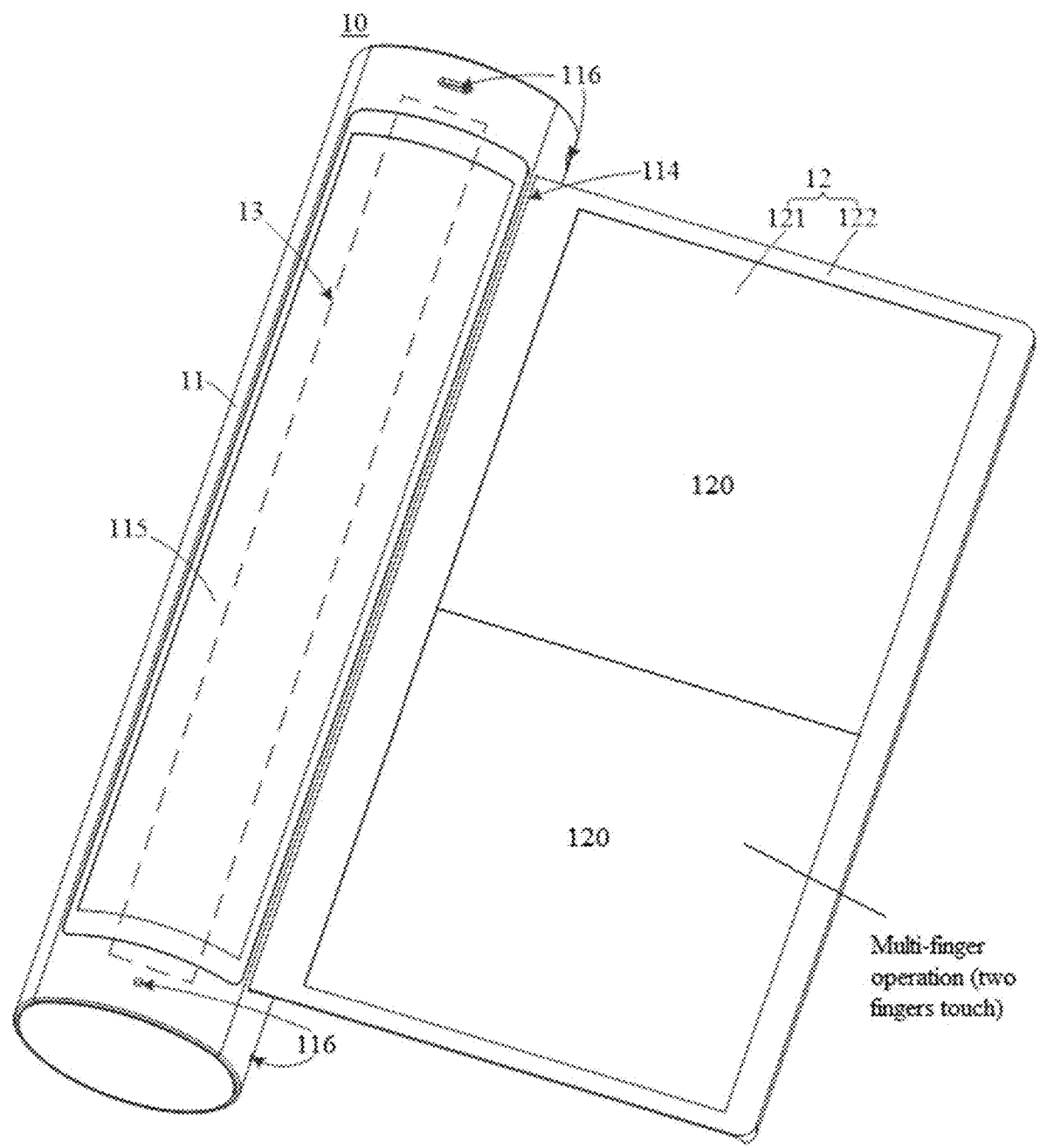
FIG. 9 illustrates a first schematic diagram of a flexible display in an extended state in an electronic device according to an embodiment of the present disclosure.

FIG. 9 illustrates a first schematic diagram of a flexible screen 12 in an exposed state according to an embodiment of the present disclosure. The flexible screen 12 may be released by pulling one end of the flexible screen 12 out of the main body 11 via the slit 114.

The main body 11 may be provided with a positioning member at the slit 114 to maintain the end of the flexible screen 12 exposed at the slit 114.

The flexible screen 12 may be protected using a flexible display overlay such as a flexible transparent glass layer, a flexible light transmissive plastic, a flexible sapphire, or other flexible transparent dielectric layer.

Illustratively, the flexible screen 12 may include a display area 121 and a non-display area 122. The non-display area 122 may be disposed around the display area 121, and the non-display area 122 may be formed at the periphery of the display area 121. The exposed end of the flexible screen 12 may be the part of the non-display area 122. In the first state, the display area 121 may be completely accommodated in the main body 11, and a part of the non-display area 122 is exposed from the main body 11.

As shown in FIGS. 1, 8, and 9, in some embodiments, the electronic device 10 may further include a rotating shaft 13 disposed in the main body 11. The rotating shaft 13 is rotatable inside relative to the outer surface (for example, the cylindrical surface 1120) of the main body 11. The rotating shaft 13 may be a hollow structure, and some elements such as a main board, a battery, or the like of the electronic device 10 may be disposed inside the rotating shaft 13. The rotating shaft 13 may be rotated not only with respect to the outer surface, but also with respect to the elements inside the electronic device 10.

The rotation of the rotating shaft 13 may drive the flexible screen 12 to reel. One end of the flexible screen 12 may be fixed on the rotating shaft 13, and the flexible screen 12 may be wound clockwise on the rotating shaft 13. The flexible screen 12 is gradually accommodated in the main body 11 during the winding of the flexible screen 12.

The rotating shaft 13 may be rotated counterclockwise by pulling the exposed end of the flexible screen 12 to release the flexible screen 12 to the outside for display.

The rotation of the rotating shaft 13 may be automatically controlled by the processor and the driving mechanism of the electronic device 10, so that the flexible screen 12 is housed in the main body 11 or be pulled out from the main body 11 to the outside following the rotation of the rotating shaft 13. The flexible screen 12 may also be pulled out of the main body 11 by a manually controlled manner, such as by pulling one end of the flexible screen 12. The flexible screen 12 may also be controlled to be housed within the main body 11 or be pulled out of the main body 11 by, for example, manually rotating the rotating shaft 13.

In other embodiments, the flexible screen 12 may be partly wound around the cylindrical surface 1120 of the main body 11 for display.

Figure 10:
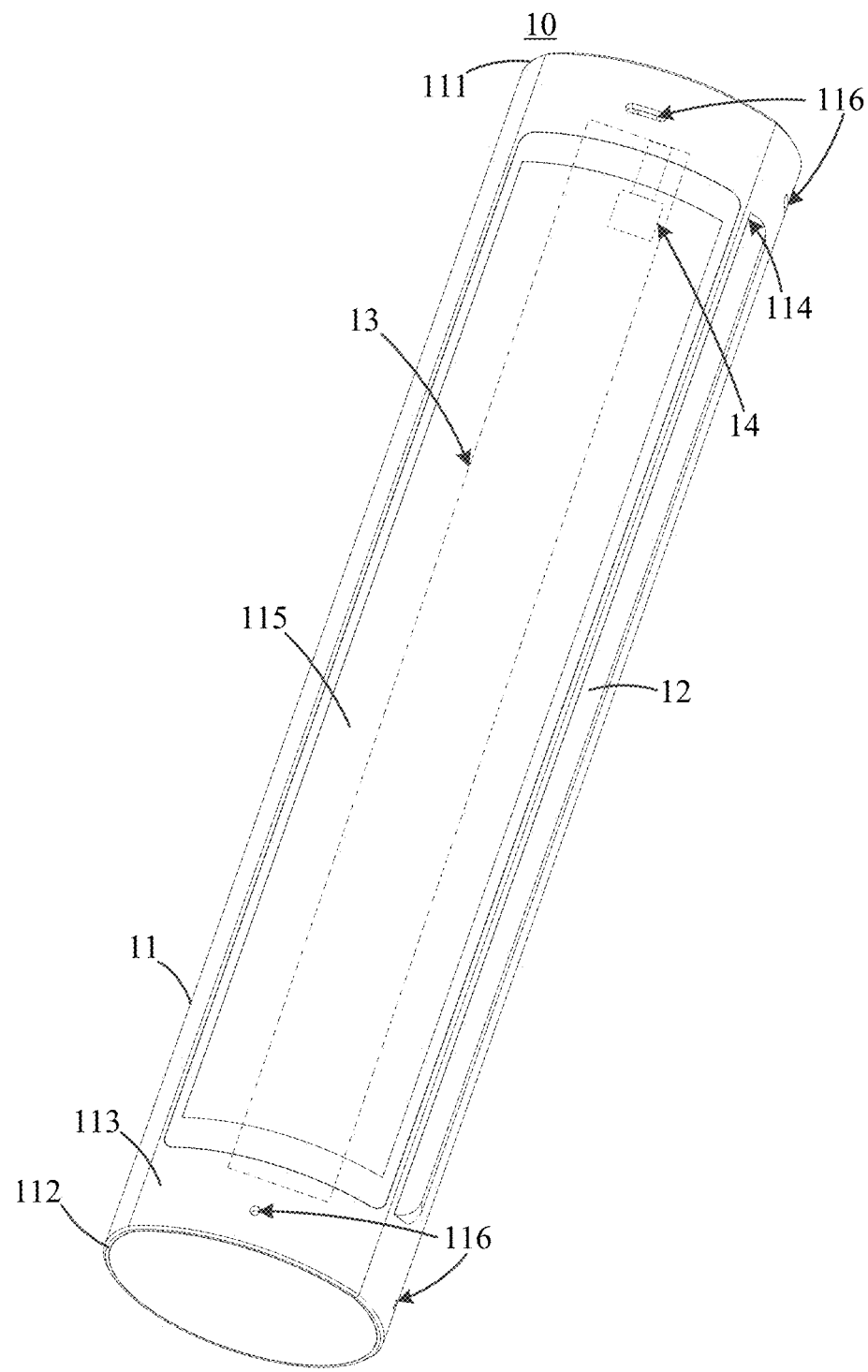
FIG. 10 illustrates a second perspective view of an electronic device according to an embodiment of the present disclosure.

FIG. 10 illustrates a second perspective view of an electronic device according to an embodiment of the present disclosure. The electronic device 10 may include a first driving mechanism 14. The first driving mechanism 14 may include a driving motor and a gear set. The driving motor may be meshed with the gear set. The gear set may be fixedly coupled to the rotating shaft 13 and may be rotated by the driving motor to drive the rotating shaft 13 to rotate. The driving mechanism of the electronic device 10 is not limited thereto.

The electronic device 10 may further include one or more of function modules 100 such as a receiver, a microphone, an electroacoustic device, a projection optical module, a camera module, an indicator light, a receiver, a microphone, a radiator, a charging module, a heat dissipation module, and a decorative member.

Figure 11:
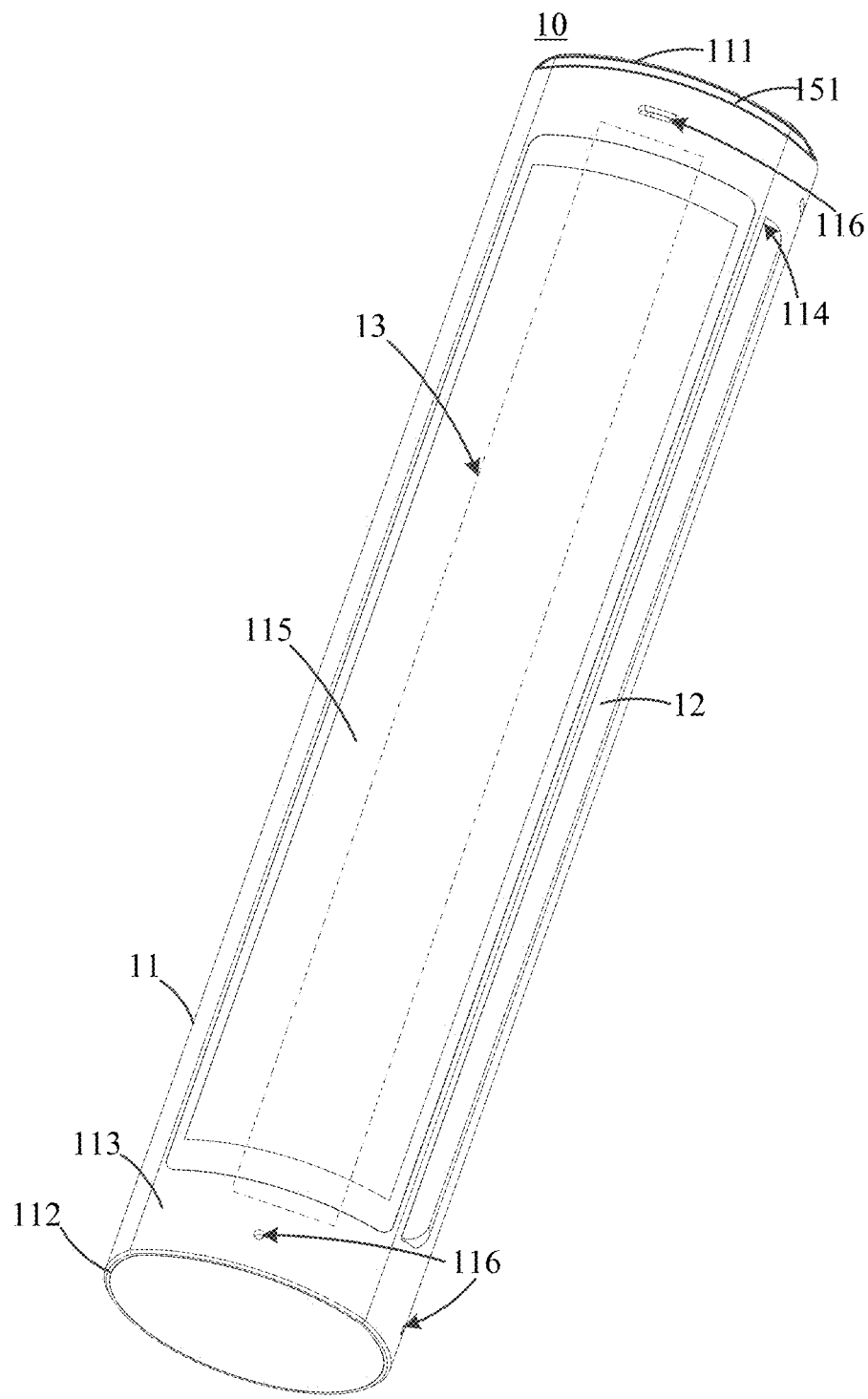
FIG. 11 illustrates a third perspective view of an electronic device according to an embodiment of the present disclosure.

FIG. 11 illustrates a third perspective view of an electronic device according to an embodiment of the present disclosure. The electronic device 10 may further include a radiator 151, and the radiator 151 may be disposed on the first side portion 113 by injection molding. The radiator 151 may also be fixedly attached to the first side portion 113 by a fixing element, such as by glue bonding, screwing by screws, or the like. The radiator 151 may be formed on the outer surface of the main body 11, and the clearance area of the radiator 151 may be increased.

The radiator 151 may transmit a radio frequency signal and a Wi-Fi signal. The radiator 151 transmitting the radio frequency signal may implement the wireless communication function of the electronic device 10.

The radiator 151 may also be disposed on the inner surface of the first side portion 113. It is also possible to provide a through hole or a groove on the first side portion 113 to place the radiator 151. The radiator 151 may be provided with a number of radiators 151 around the first side portion 113 and may be spaced apart in the direction around the first side portion 113. It is possible that a number of radiators 151 are spaced apart in the circumferential direction of the main body 11, such as three radiators 151 spaced apart at positions spaced around the first side portion 113 and close to the first end portion 111.

Illustratively, one or more radiators 151 may be disposed adjacent to the first end 111 or disposed at a corner position of the main body 11. The radiator 151 may also be spaced apart from the first end surface 111 by a predetermined length. In other embodiments, one or more radiators 151 may be disposed adjacent to the second end 112.

It should be noted that the radiator 151 is not limited to be disposed on the first side portion 113. The radiator 151 may also be disposed on the first end 111, or the second end portion 112.

Illustratively, the electronic device may further include a guide rail and a driving member. The radiator 151 may be disposed on the guide rail, and be driven by the driving member to move along the guide rail to a position where the signal intensity value is the largest. The guide rail may be arranged along the axial direction of the main body 11, and the number of the radiators 151 may be more than one which may be disposed apart at opposite ends of the guide rail.

Figure 12:
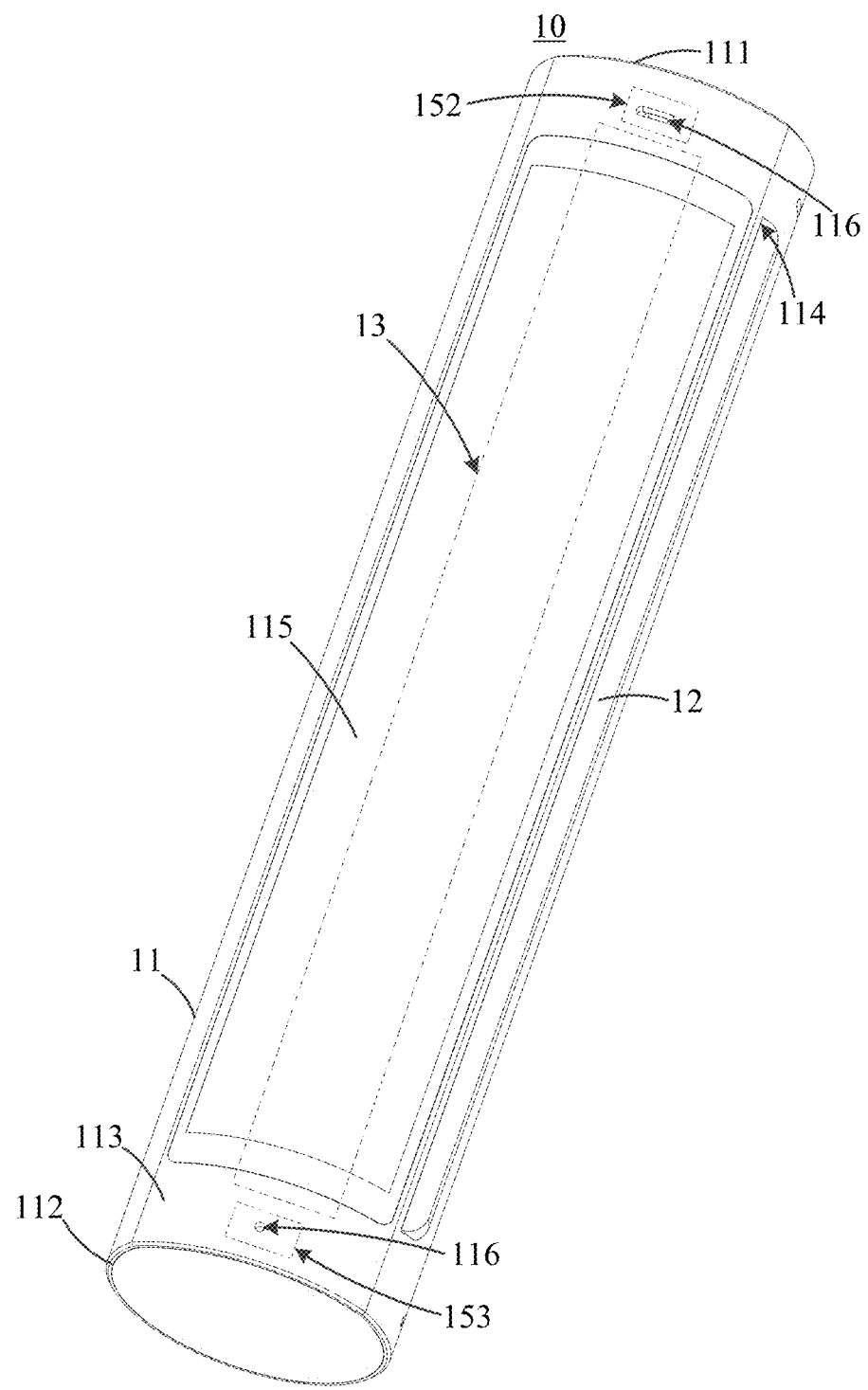
FIG. 12 illustrates a fourth perspective view of an electronic device according to an embodiment of the present disclosure.

FIG. 12 illustrates a fourth perspective view of an electronic device 10 according to an embodiment of the present disclosure. The electronic device 10 may include a receiver 152 and a microphone 153, and the receiver 152 and the microphone 153 may transmit acoustic signals. The receiver 152 and the microphone 153 may be disposed within the main body 11. A transmitting portion 116 may include one or more sound holes. The receiver 152 may transmit acoustic signals to the outside of the main body 11 through the one or more sound holes. The microphone 153 may receive sound signals from the outside through the one or more sound holes.

Illustratively, the receiver 152 and the microphone 153 are spaced apart from each other, such as the receiver 152 and the microphone 153 are located at opposite ends of the light transmitting region 115 in the axial direction of the body 11. The receiver 152 may be located at the first end 111 and the microphone 153 may be located at the second end 112.

Through the plurality of sound holes, the electronic device 10 may realize multi-directional transmission of sound signals, which may be used by many people in a conference scene, for example.

The receiver 152 and/or the microphone 153 may be rotated in the circumferential direction of the main body 11 to realize a 360-degree circular transmitting along the circumferential direction of the electronic device 10.

Figure 13:
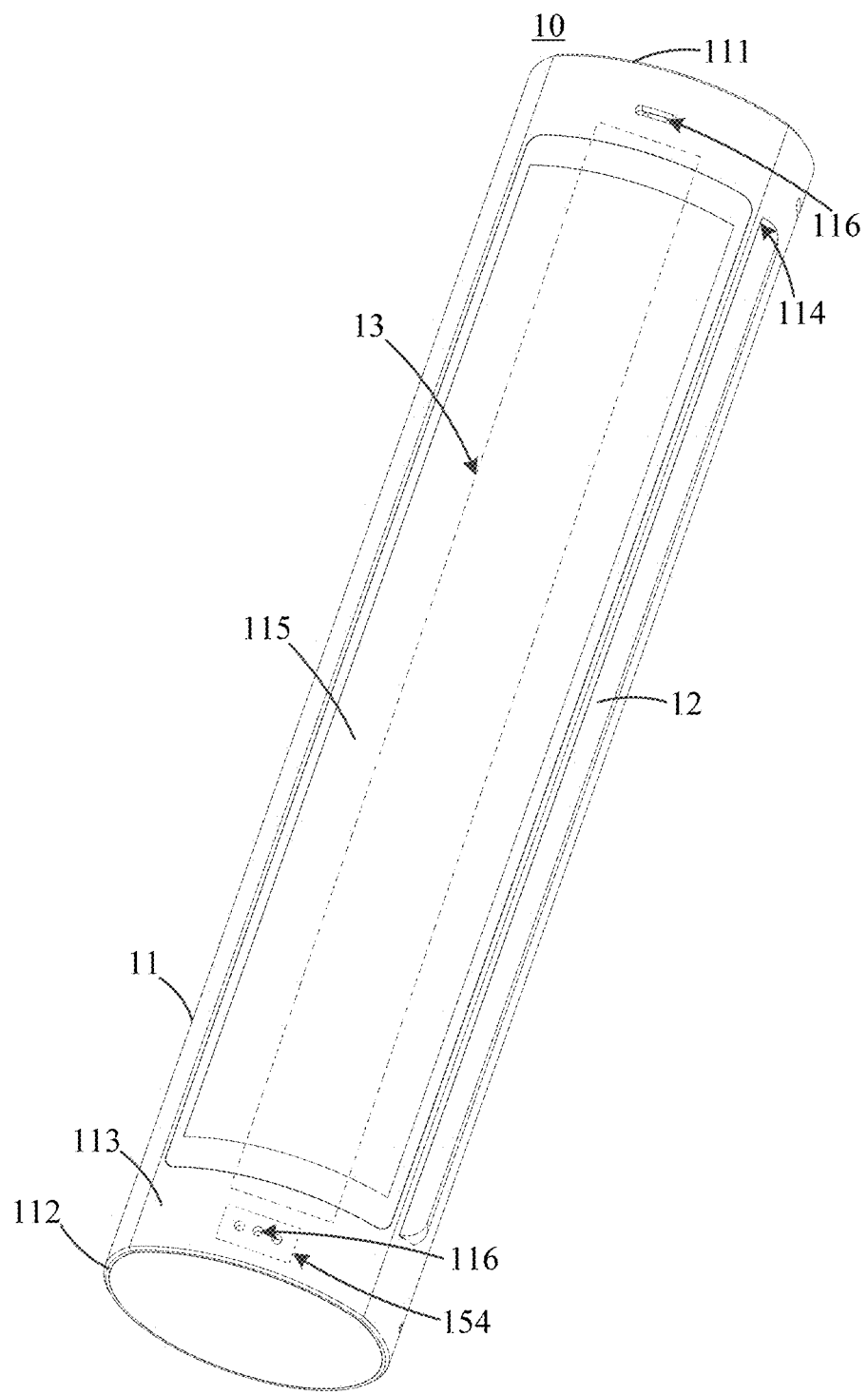
FIG. 13 illustrates a fifth perspective view of an electronic device according to an embodiment of the present disclosure.

FIG. 13 illustrates a fifth perspective view of an electronic device according to an embodiment of the present disclosure. The electronic device 10 may include a speaker 154 that may transmit an acoustic signal. The transmitting portion 116 may include one or a sound hole. The speaker 154 may transmit an acoustic signal to the outside of the main body 11 through the one or more sound holes. The speaker 154 may transmit sound signals in different directions through the sound holes for better sound effects. Wherein, the speaker 154 may be disposed at the first end 111 or the second end 112.

Figure 14:
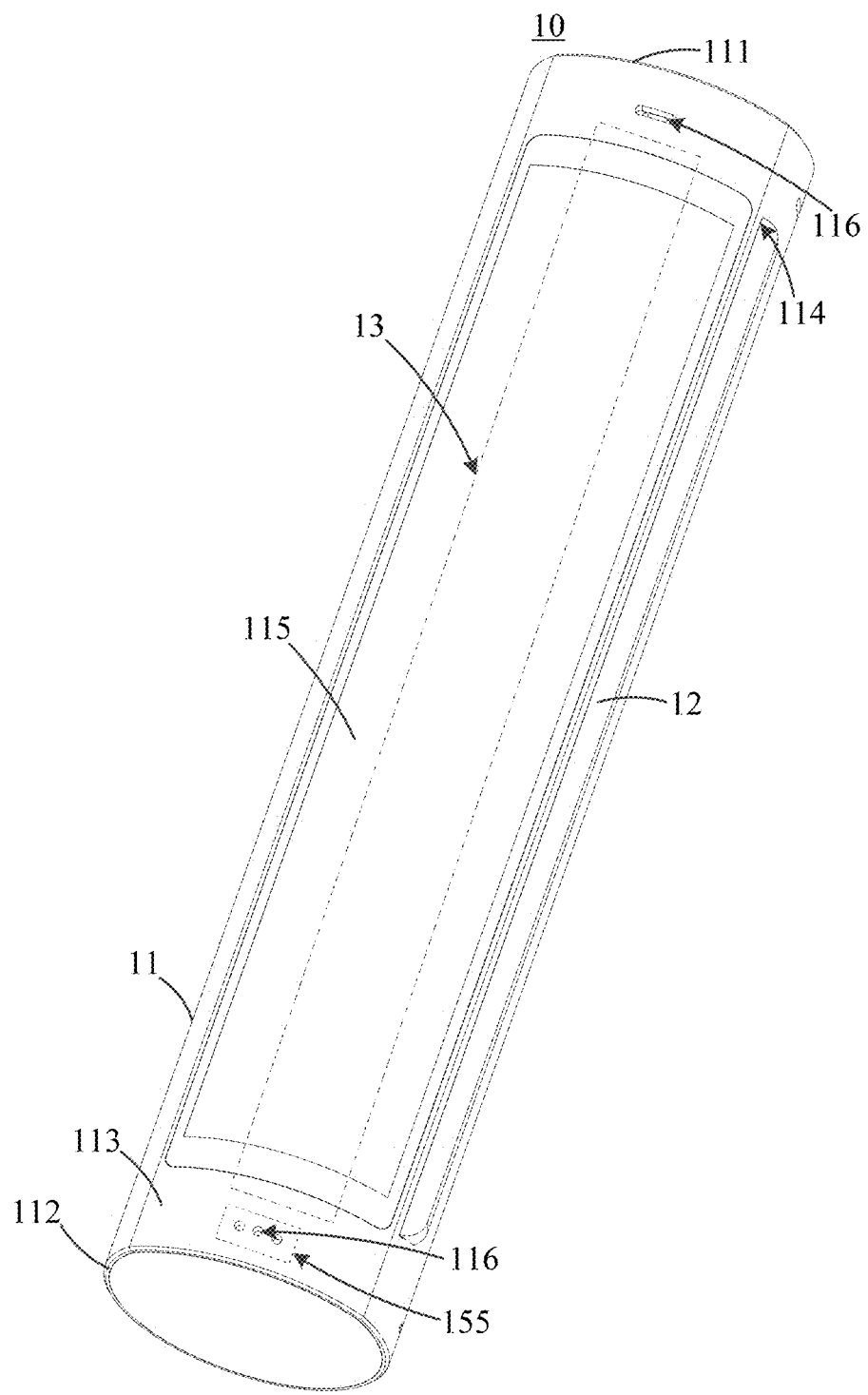
FIG. 14 illustrates is a sixth perspective view of an electronic device according to an embodiment of the present disclosure.

FIG. 14 illustrates a sixth perspective view of an electronic device according to an embodiment of the present disclosure. The electronic device 10 may include an electroacoustic device 155 that may transmit an acoustic signal. The transmitting portion 116 may include one or more sound hole. The electroacoustic device 155 may transmit acoustic signals to the outside of the main body 11 through the one or more sound holes. Wherein, the electroacoustic device 155 may be disposed at the second end 112, and the speaker 154 may also be disposed at the first end 111. Illustratively, the electroacoustic device 155 employs a speaker 154. The electroacoustic device 155 may emit a preset sound during the process of the flexible screen 12 releasing from the main body 11. The preset sound may be a metallic sound effect, such as a sound of a gear rotating, the sound of slaps, the sound of slaps, etc.

Figure 15:
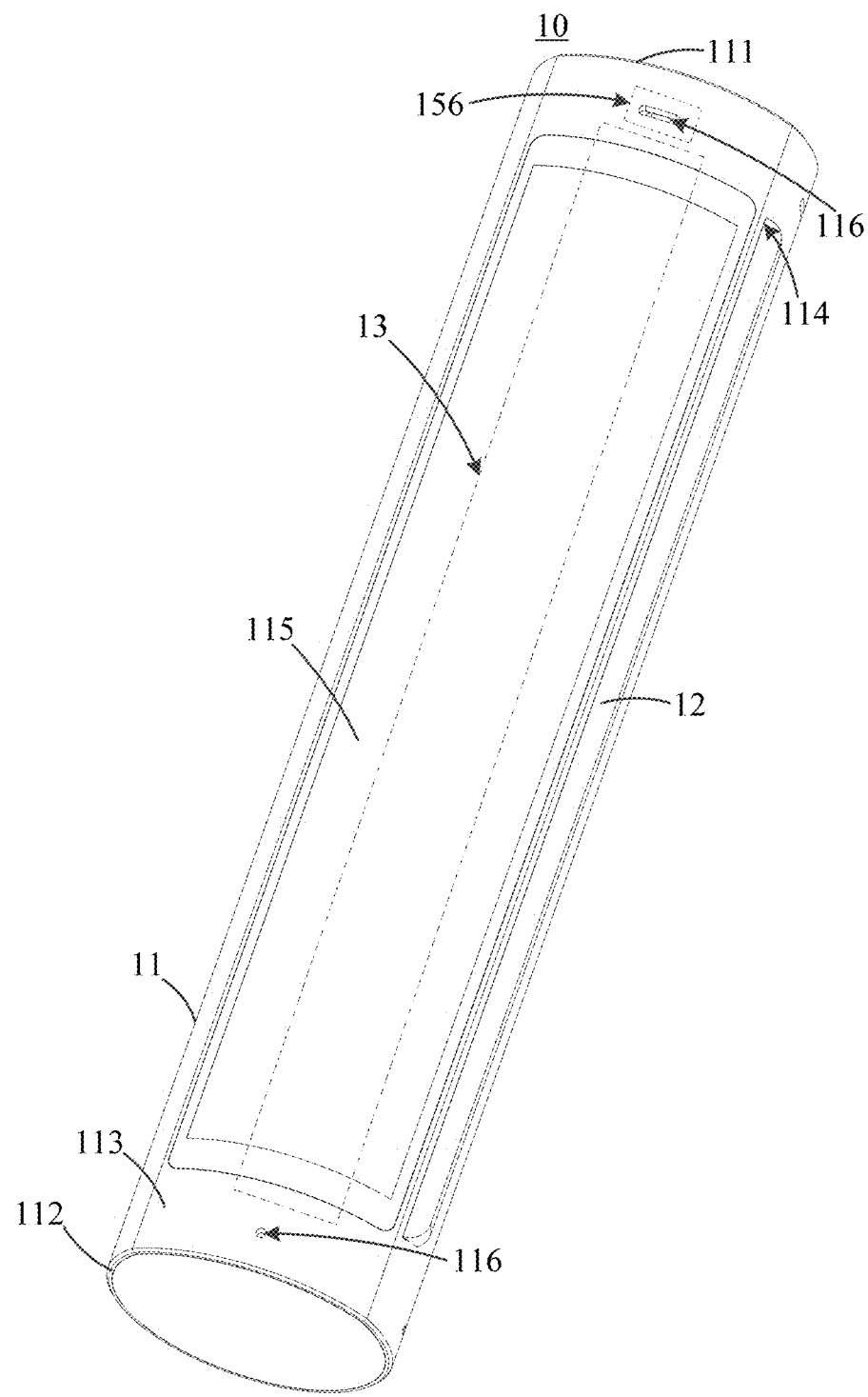
FIG. 15 illustrates is a seventh perspective view of an electronic device according to an embodiment of the present disclosure.

FIG. 15 illustrates a seventh perspective view of an electronic device according to an embodiment of the present disclosure. The electronic device 10 may include a camera module 156 for photographing. The transmitting portion 116 may include a light transmitting region. The camera module 156 may have one or more lens assemblies with different incident plane to capture images from different directions through a corresponding transmitting region, respectively. The camera module 156 may be disposed at the first end 111. The lens assembly of the camera module 156 may face outward from the first side portion 113 of the main body 11 or may be outward from the first end 111. The camera module 156 may also be disposed at other locations, such as the second end 112.

The camera module 156 is movable in the circumferential direction of the main body 11 to achieve a 360-degree circumferential acquisition image, in order to facilitate the camera module 156 to collect images in different directions. In other embodiments, the camera module 156 may rotate around the circumference direction of the main body 11.

A flash light may be disposed adjacent to the camera module 156.

Illustratively, the electronic device 10 may also include at least one sensor that may detect a trigger signal. When the sensor detects the trigger signal, the camera module 156 may be rotated to a preset position to collect a face image to unlock the electronic device 10 by face recognition. One or more buttons may be disposed on the main body 11, which may be physical buttons or virtual buttons. The color of the button is the same as the color of the main body 11, and the camera module 156 may be rotated to the position corresponding to the button to collect the face image.

Illustratively, the function module 100 may include a carrier 16, and the camera module 156 may be disposed on the carrier 16. In the first state, the camera module 156 and the carrier 16 are received and hidden in the main body 11. When the trigger signal of the camera activation is detected, the camera module 156 and the carrier 16 may extend out of the main body 11 along the axial direction of the main body 11 to be exposed. The camera module 156 captures images. When the carrier 16 and the camera module 156 are exposed to the main body 11, the carrier 16 and the camera module 156 may be moved relative to the main body 11 to achieve misalignment, so that the camera module 156 may be in focus.

Figure 16:
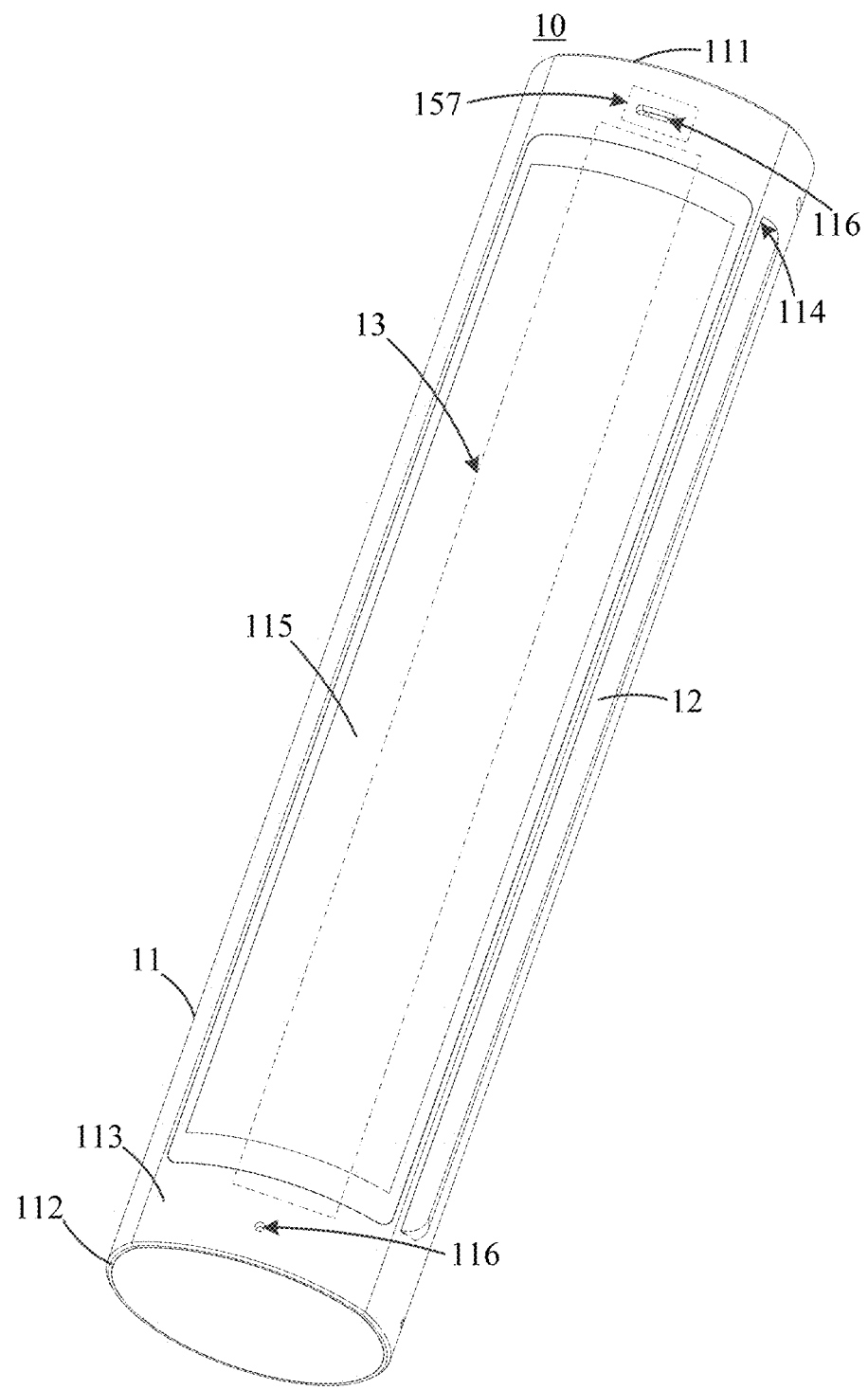
FIG. 16 illustrates an eighth perspective view of an electronic device according to an embodiment of the present disclosure

FIG. 16 illustrates an eighth perspective view of an electronic device according to an embodiment of the present disclosure. The electronic device 10 may include a projection optical module 157. The transmitting portion 116 may be a hole for light transmitting. The projection optical module 157 may transmit optical signals through the transmitting portion 116, such as implementing a projection function, and may project a picture to the outside. The projection optical module 157 may be disposed at the first end 111. The projection optical module 157 may also be disposed at other locations, such as the second end 112.

The projection optical module 157 is movable in the circumferential direction of the main body 11 to realize a 360-degree projection picture of the projection optical module 157, in order to facilitate the projection optical module 157 to project a picture toward different directions. That is, the projection optical module 157 may rotate around the circumference direction of the main body 11.

Illustratively, the projection optical module 157 may be disposed on a carrier 16. In the first state, the projection optical module 157 and the carrier are received and hidden in the main body 11. When the trigger signal of the projection start is detected, the projection optical module 157 and the carrier may extend out of the main body 11 in the axial direction of the main body 11 to be exposed, to project images. When the carrier and the projection optical module 157 are exposed out of the main body 11, the carrier and the projection optical module 157 may be moved relative to the main body 11 to achieve misalignment, so that the projection optical module 157 may be in focus.

Figure 17:
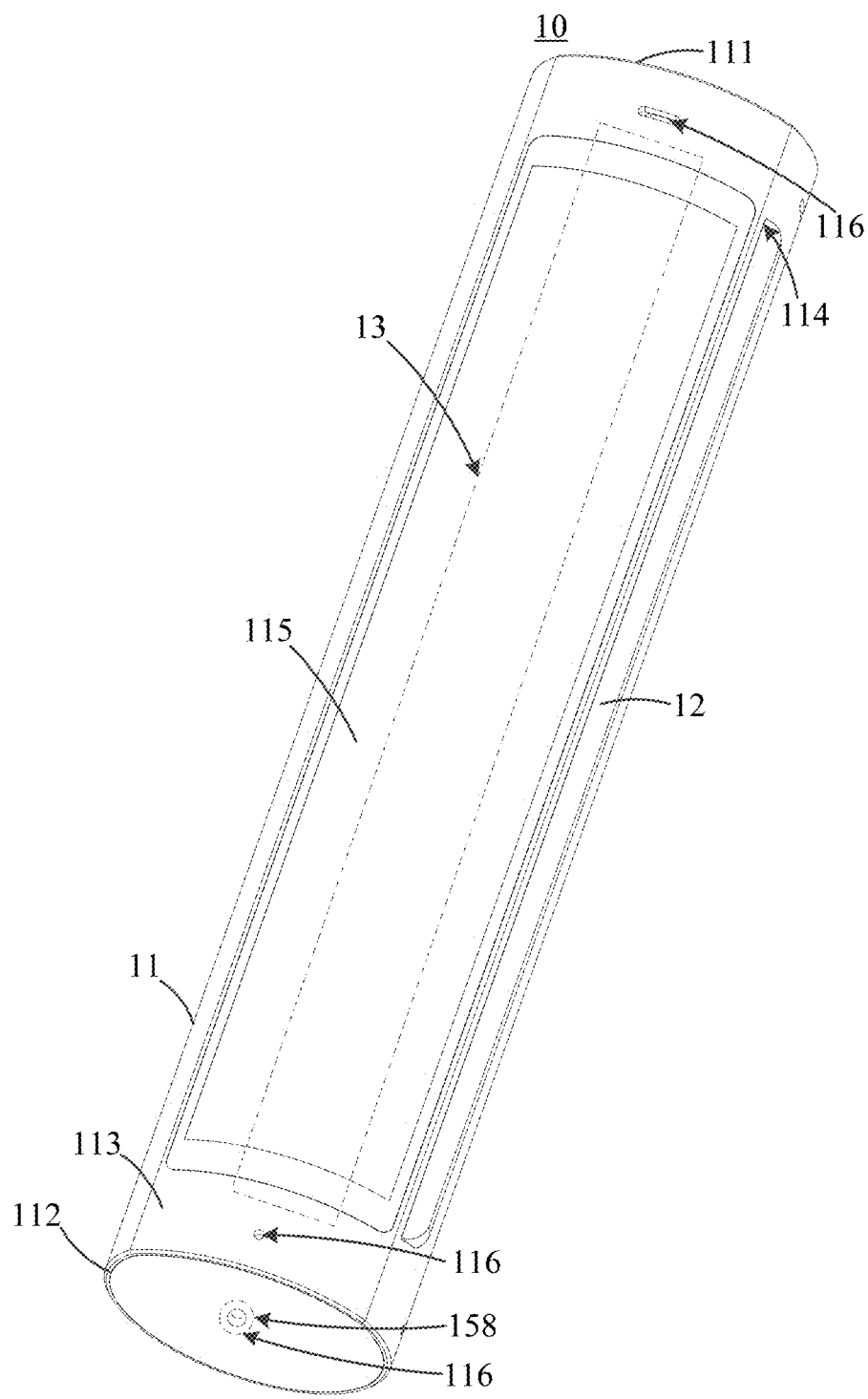
FIG. 17 illustrates a ninth perspective view of an electronic device according to an embodiment of the present disclosure.

FIG. 17 illustrates a ninth perspective view of an electronic device according to an embodiment of the present disclosure. The electronic device 10 may include an indicator light 158, and the transmitting portion 116 may include a hole for light transmitting by the indicator light 158. The indicator light 158 may be disposed at the first end 111 or the second end 112. Illustratively, the indicator light 158 may be illuminated in the axial direction of the main body 11 to achieve the illumination function of the electronic device 10. The indicator light 158 may also emit light to other directions.

Illustratively, the indicator light 158 may emit different optical signals. The indicator light 158 may be multiple, and the plurality of indicator lights 158 may emit light toward different positions of the electronic device 10 through a number of transmitting portions 116 and may also emit light signals of different colors.

The projection optical module 157 may be movable along the circumferential direction of the main body 11 to realize a 360-degree circumferential projection picture of the projection optical module 157. That is, the projection optical module 157 may rotate around the circumference direction of the main body 11.

Figure 18:
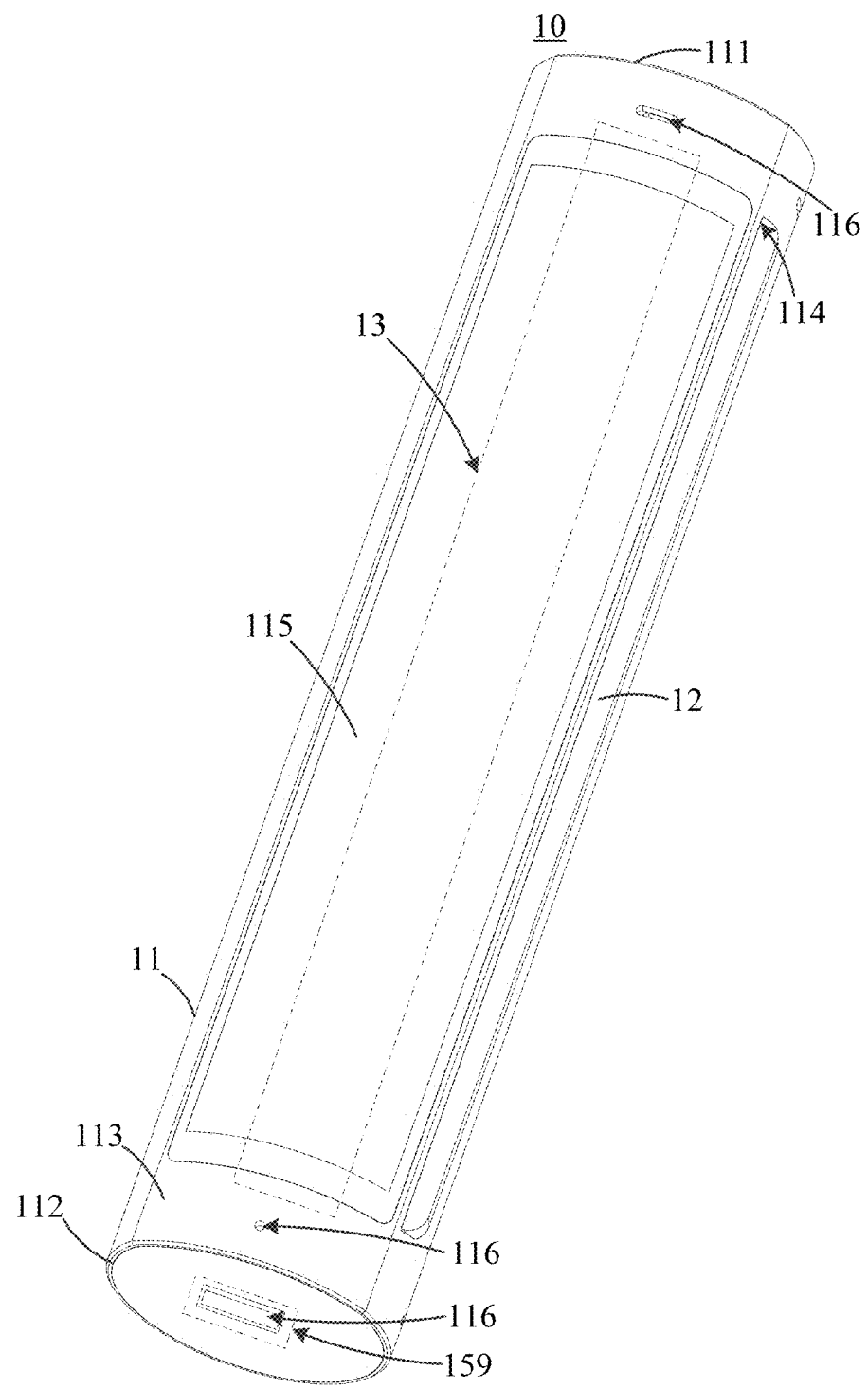
FIG. 18 illustrates a tenth perspective view of an electronic device according to an embodiment of the present disclosure.

FIG. 18 illustrates a tenth perspective view of an electronic device according to an embodiment of the present disclosure. The electronic device 10 may include a charging module 159, and the transmitting portion 116 may be a charging interface for charging. The charging module 159 may be disposed at the first end 111 or the second end 112.

The charging module 159 is not limited to charging the electronic device 10 through the charging interface, but also may be charged in wirelessly way via a wireless charging coil. The charging module 159 may also charge the electronic device 10 in a wired and wireless manner together through the charging interface.

Exemplarily, the charging module 159 may charge the electronic device 10 by using one or more charging modules including a normal charging mode and a flash charging mode. The charging power of the flash charging mode is greater than the power of the normal charging mode. Among them, the flash charging mode uses a low voltage and high current mode to increase the current and realizes the output of the segmented cross current through the open voltage loop under the premise of low voltage and high current.

Illustratively, the electronic device 10 may further include a decorative piece, which may be a pattern formed on an outer surface of the main body 11. The decorative piece may also be other structures such as a compass or the like. The decorative pieces may be used for decoration or indication.

Figure 19:
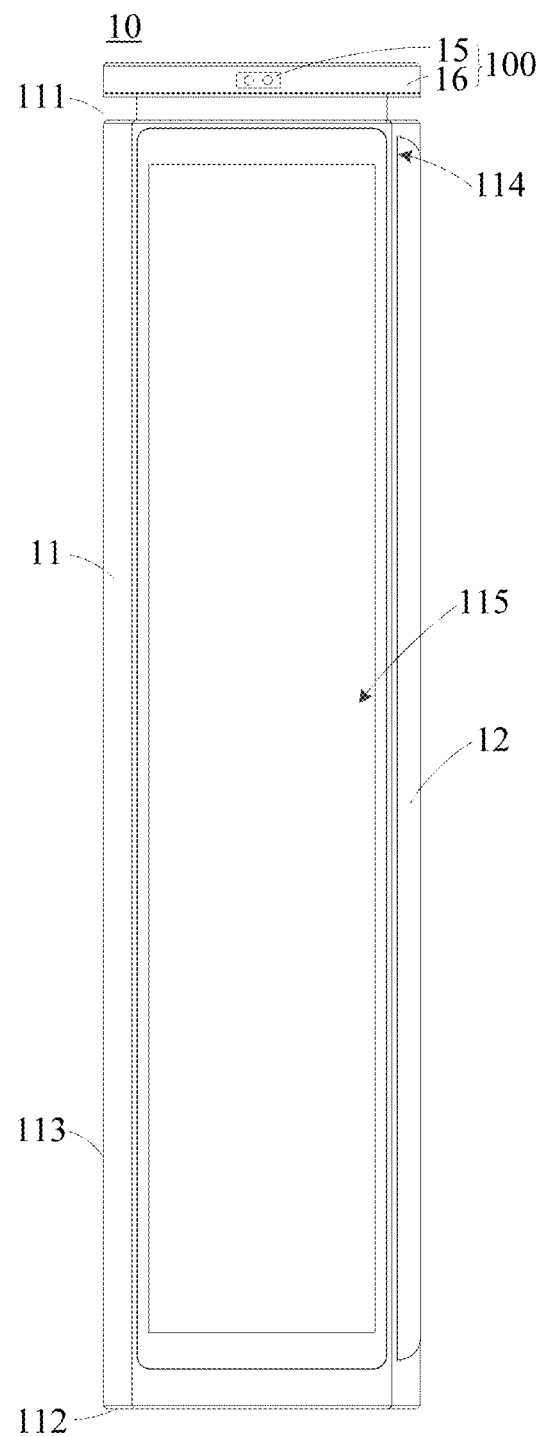
FIG. 19 illustrates a second schematic diagram of a standing state of an electronic device according to an embodiment of the present disclosure.

FIG. 19 illustrates a second schematic diagram of a standing state of the electronic device 10 according to an embodiment of the present disclosure. The electronic device 10 may also include a function module 100, which may include a carrier 16 and a functional device 15 disposed on the carrier 16. The function module 100 may be disposed at the first end 111. The function module 100 is rotatable relative to the main body 11, such as rotatable in the circumferential direction of the main body 11, that is, the function module 100 is rotatable along the circumferential direction of the main body 11. The functional device 15 may include one or more of a receiver, a microphone, a speaker, a projection optical module, a camera module, an indicator light, a radiator, a charging module, a heat dissipation module, and a decorative component. Through the rotation of the function module 100, the functional device 15 may transmit signals in different directions to realize 360-degree transmission of signals by the electronic device, such as 360-degree acquisition of images, projection images, transmission of sound signals, illumination, and the like.

The function module 100 may be two and may be respectively disposed at the first end 111 and the second end 112 to achieve rotation respectively.

Figure 20:
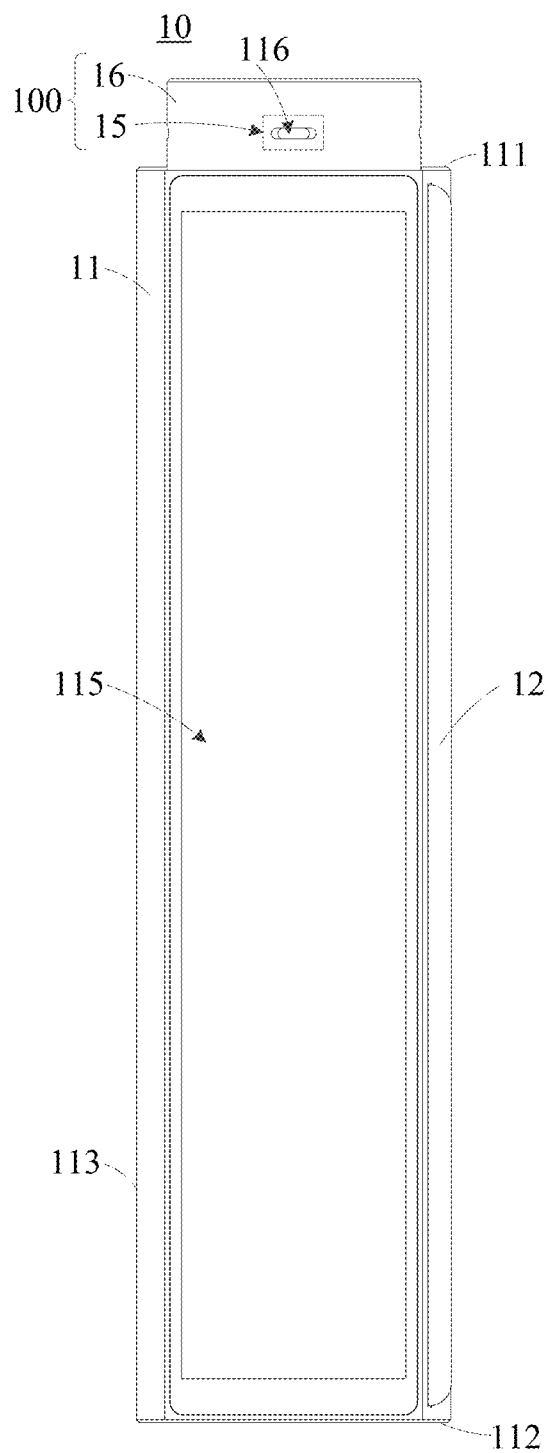
FIG. 20 illustrates a third schematic diagram of a standing state of an electronic device according to an embodiment of the present disclosure.

FIG. 20 illustrates a third schematic diagram of a standing state of an electronic device according to an embodiment of the present disclosure. The electronic device 10 may also include a function module 100, which may include a carrier 16 and a functional device 15 disposed on the carrier 16. The function module 100 may be disposed at one of the ends of the main body 11, such as the first end 111. The function module 100 is telescopically movable relative to the main body 11. The function module 100 may be hidden in the main body 11 and may be pulled out from the inside of the main body 11 to the outside of the main body 11. In the first state, the carrier 16 and the functional device 15 thereon may be housed and concealed within the main body 11, and when signal transmission is required, such as when an extension command is detected, the carrier 16 and the functional device 15 thereon may extends out of the main body 11 to be exposed for signal transmission along the axial direction of the main body 11. The functional device 15 may include one or more selected from the group consisting of a receiver, a microphone, a speaker, a projection optical module, a camera module, an indicator light, a radiator, a charging module, a heat dissipation module, and a decorative component. Through the telescopic movement of the function module 100, the functional device 15 may be accommodated within the main body 11 for protection, and the functional device 15 may be extended outside the main body 11 for signal transmission, such as acquiring images, projecting pictures, transmitting sound signals, and lighting, etc.

Figure 21:
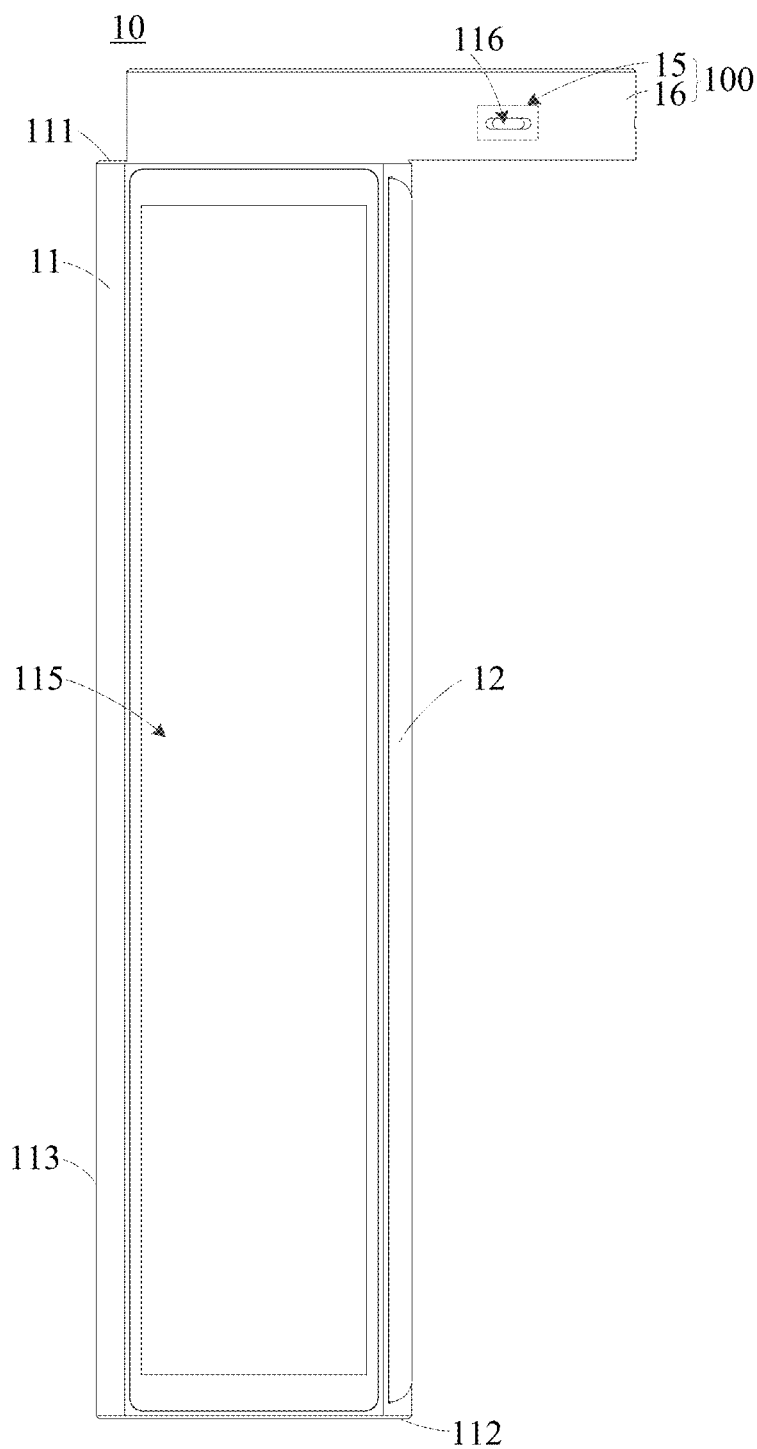
FIG. 21 illustrates a fourth schematic diagram of a standing state of an electronic device according to an embodiment of the present disclosure.

FIG. 21 illustrates a fourth schematic diagram of a standing state of an electronic device according to an embodiment of the present disclosure. When the carrier 16 and the functional device 15 thereon are exposed outside the main body 11, the carrier 16 may be moved relative to the main body 11 to achieve misalignment. When the function device 15 includes a camera module, it may in focus.

Figure 22:
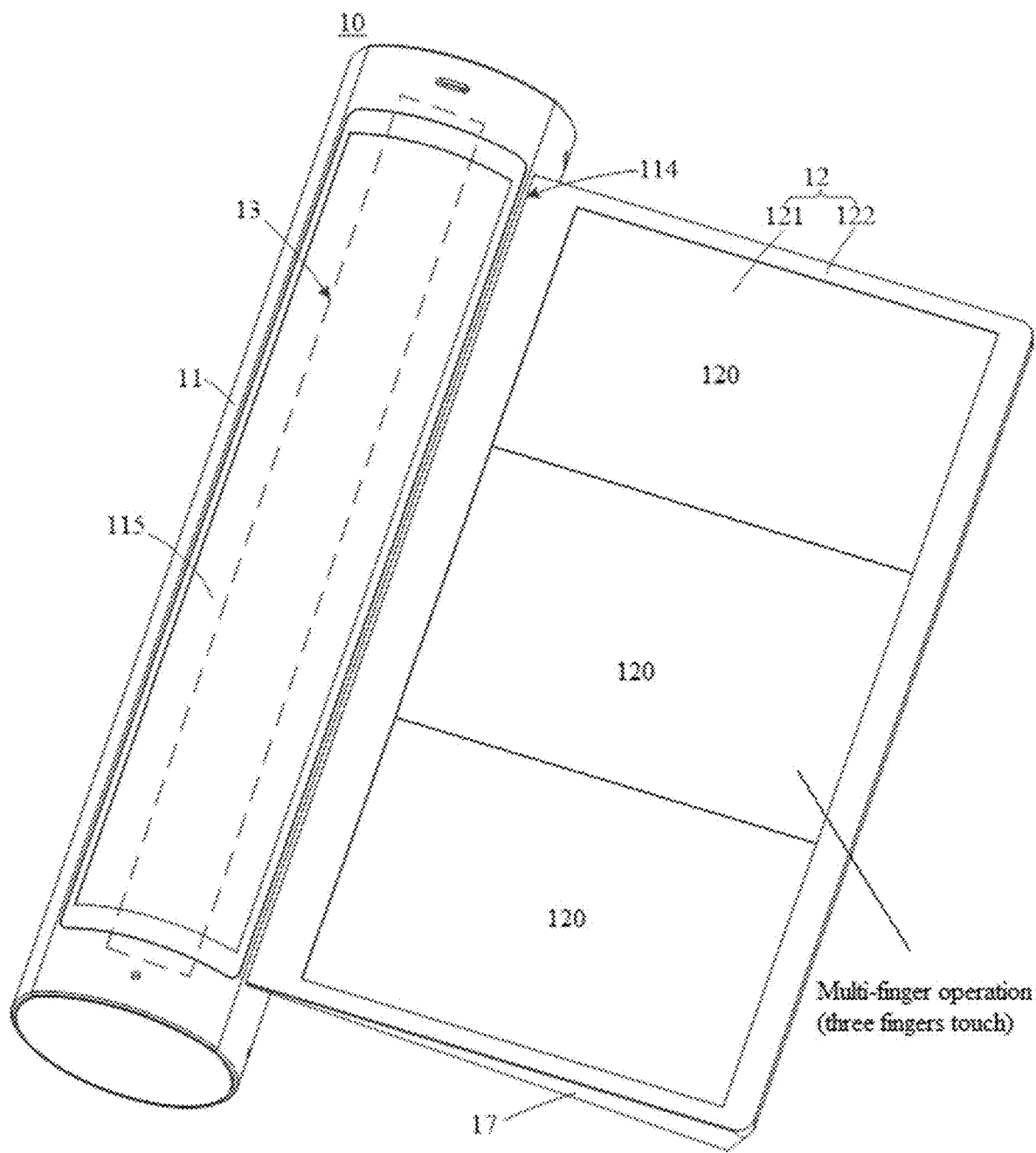
FIG. 22 illustrates a second schematic diagram of a flexible display in an extended state in an electronic device according to an embodiment of the present disclosure.

FIG. 22 illustrates a second schematic diagram of a flexible screen in an exposed state in an electronic device according to an embodiment of the present disclosure. The electronic device 10 may also include a support element 17, on which the flexible screen 12 may be disposed. When the flexible screen 12 extends from the main body 11, the support element 17 follows the flexible screen 12. When the flexible screen 12 is deployed, the support element 17 keeps the flexible screen 12 in an unfolded state. The support element 17 may be supported on the non-display surface of the flexible screen 12 to ensure the flexible screen 12 exposed. When the flexible screen 12 is housed in the main body 11, the support element 17 may be housed in the main body 11.

Figure 23:
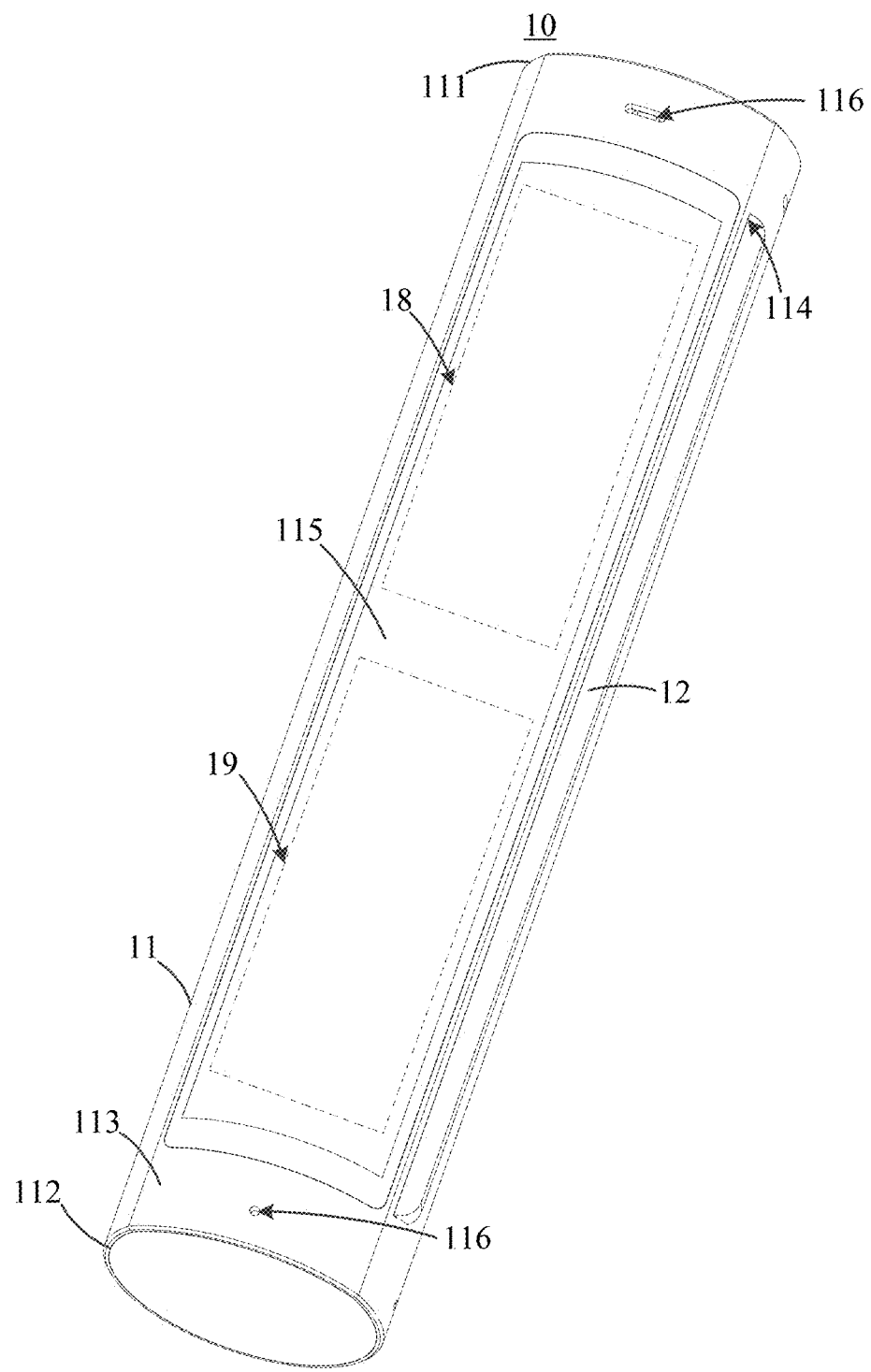
FIG. 23 illustrates an eleventh perspective view of an electronic device according to an embodiment of the present disclosure.

FIG. 23 illustrates an eleventh perspective view of an electronic device according to an embodiment of the present disclosure. The electronic device 10 may include a motherboard 18. The main board 18 may be disposed inside the main body 11. The main board 18 may be provided in a plate-like structure, and the main board 18 may also be disposed in an arc structure. The main board 18 may be electrically connected to the device of the electronic device 10 to control the electronic device 10 to transmit signals.

Figure 24:
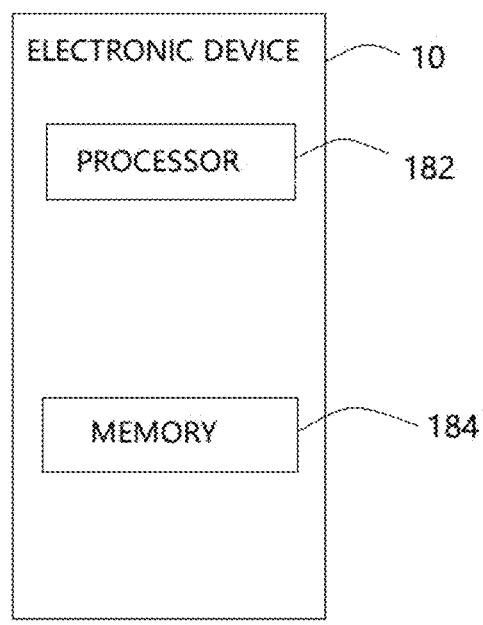
FIG. 24 illustrates a block diagram of an electronic device according to an embodiment of the present disclosure.

FIG. 24 illustrates a block diagram of an electronic device according to an embodiment of the present disclosure. The electronic device 10 may include a processor 182 that may be integrated on the motherboard 18. The processor 182 may be electrically connected to the device of the electronic device 10 to control the transmission of signals by the electronic device 10.

Illustratively, the processor 182 may be electrically connected to the flexible screen 12. The processor 182 may control the flexible screen 12 to display a picture. The processor 182 may also be electrically connected to other displays to control other displays for display.

Illustratively, the processor 182 may be electrically connected to a first driving mechanism 14 drivingly coupled to the rotating shaft 13. The processor 182 may control the first driving mechanism 14 to generate a driving force according to operation instructions applied on the main body 11 or the flexible screen 12, such as touch signals applied on touch area of the main body 11, touch signals applied on touching sensitive area of the flexible screen 12, or pressure applied on buttons of the main body 11, to drive the rotating shaft 13 to rotate, thereby driving the flexible screen 12 to move, so that the flexible screen 12 is released from the first side portion 113 out of the main body 11, being in the second state, or retracted into the main body 11, being in the first state.

The operation instructions may include a sliding operation, and the processor 182 is configured to control the flexible screen to move toward a preset direction according to the sliding operation, in detail, to control the first driving mechanism 14 to drive the rotating shaft 13 to rotate in a preset direction according to the sliding operation of the preset direction, so that the flexible screen 12 moves toward the preset direction. The sliding operation may be performed on the flexible screen 12.

The specific control manner is, for example, when performing a sliding operation in a first direction, the processor 182 controls the first driving mechanism 14 to drive the rotating shaft 13 to rotate in a first direction, when performing a sliding operation in a second direction, the processor 182 controls the driving of the first driving mechanism 14 to rotate in the second direction.

The first direction and the second direction may be directions perpendicular to the axial direction of the body 11. The first direction and the second direction may be opposite, and the first direction and the second direction have at least one opposite component. When the first direction and the second direction are not perpendicular to the axial direction of the body 11, the first direction and the second direction have at least a component perpendicular to the axial direction of the body 11. The rotating shaft 13 is rotatable toward a component perpendicular to the axial direction of the main body 11.

Illustratively, the processor 182 is configured to, according to the sliding distance of the sliding operation, control the exposed length of the flexible screen 12 released form the main body 11, or the processor 182 is used for, according to the sliding distance of the sliding operation, controlling the angle at which the first drive mechanism 14 drives the flexible screen 12 to rotate and controlling the size of the flexible screen 12 to be exposed or received. The sliding distance may be a distance perpendicular to the axial direction of the main body 11 or may be a distance around the first side portion 113. The processor 182 is configured to, according to the sliding force of the sliding operation, control the speed at which the first drive mechanism 14 drives the rotation of the rotary shaft 13, or the speed at which the flexible screen 12 is moved. The sliding force of the sliding operation may be the strength of pressing the screen of the electronic device 10 and may be detected by using a pressure sensor. If the sliding force of the sliding operation is large, the processor 182 controls the speed at which the first driving mechanism 14 drives the rotating shaft 13 to rotate at a high speed; the sliding force of the sliding operation is small, and the processor 182 controls the first driving mechanism 14 to drive the rotating shaft 13 to rotate at a low speed.

In some embodiments, the operation instructions includes a click operation or a long press operation, and the processor 182 is configured to control the flexible screen 12 to move according to the click operation or the long press operation, in detail, the processor 182 is configured to control the first driving mechanism 14 to drive the rotating shaft 13 *t* according to the click operation or the long pressing operation. A physical button or a virtual button may be disposed on the electronic device 10. The click operation or a long press operation may be applied on the physical button or the virtual button.

In some embodiments, the processor is configured to control a display ratio of the flexible screen according to the number of clicks of the click operation within a preset time, or the processor is configured to control the display ratio of the flexible screen according to a press strength of the long press operation.

In some embodiments, the operation instructions further include a multi-finger operation, the processor 182 is configured to control the moving of the flexible screen 12 according to the number of fingers recognized in the multi-finger operation. For example, when two fingers touch is detected, the processor 182 controls the flexible screen 12 to reel in; when three fingers touch is detected, the processor 182 controls the flexible screen 12 to reel out.

In some embodiments, the operation instructions further include a multi-finger operation, the processor 182 is configured to control the display mode of the flexible screen 12 according to the number of fingers recognized in the multi-finger operation. The display mode may be the number of the screens to be split. For example, when two fingers touch is detected, the processor 182 controls the flexible screen 12 to display on a split screen, as illustrated on FIG. 9. When three finger touch is detected, the processor 182 controls the flexible screen 12 to display three screens, as illustrated on FIG. 22. For another example, when two fingers touch is detected, the processor 182 may control the display ratio of the flexible screen 12 to be 4:3; when three fingers touch is detected, the processor 182 may control the flexible screen 12 to be 16:9. The number of split screens of the flexible screen 12 and the proportion of the split screens of the flexible screen 12 may be set according to actual needs.

The operation instruction is not limited to this. The first drive mechanism 14 may be controlled to drive the rotation of the rotating shaft 13 such as according to gravity, acceleration, acceleration direction, sound control, or the like.

Illustratively, the flexible screen 12 may be split to at least two sub-display areas 120 that may be independently displayed by at least two sub-display areas 120 to achieve a split-screen view, as illustrated on FIG. 9 and FIG. 22. The at least two sub-display areas 120 may protrude from the main body 11 to the outside of the main body 11 according to different extending operations, and the processor 182 may be configured to separately display different sub-display areas 120 of the display area according to different extending operations to control a split ratio between the at least two sub-display areas 120, for example, to control the split ratio between two sub-display areas 120 to be 1:3, that is, one sub-display area 120 occupies 25% of the whole displayed area, and the other sub-display area 120 occupies 75% of the whole displayed area. For another example, the split ratio among three sub-display areas 120 may be 1:2:2.

The extending operation may be that the processor 182 controls the first driving mechanism 14 to drive the rotating shaft 13 to move so that at least one sub-display area 120 of the flexible screen 12 protrudes out of the main body 11. The different extension operations may be that the processor 182 controls the first drive mechanism 14 to drive the rotating shaft 13 through several movements such that at least two sub-display areas 120 of the flexible screen 12 reeled out of the main body 11. The extending operation may also be that the processor 182 detects that at least one sub-display area 120 of the flexible screen 12 reels out of the main body 11.

The extending operation is not limited thereto, and the extending operation may also be a touch operation such as an operation on the display of the electronic device 10, which may be a click operation, a long press operation, a slide operation, or the like.

Illustratively, at least two sub-display areas 120 may be arranged side by side along the extending direction of the flexible screen 12 or side by side in the axial direction of the flexible screen 1. Or at least two sub-display areas 120 may be arranged side by side in the radial or axial direction of the main body 11.

Illustratively, when the battery level of the electronic device 10 is lower than a preset value, the processor 182 may be used to control the flexible screen 12 to contract into the main body 11. The preset value is, for example, five percent, ten percent, and the like to the total power. A reset of the flexible screen 12 in the electronic device 10 is implemented.

Illustratively, when the flexible screen 12 of the electronic device 10 is in the interest screen and exceeds a preset length of time, the processor 182 may be used to control the flexible screen 12 to be retracted into the main body 11. The preset duration is, for example, five seconds, ten seconds, and the like.

Illustratively, when the processor 182 receives the reset command, the processor 182 may be used to control the flexible screen 12 to reel into the main body 11. The reset command may include an operation command to the display in the electronic device 10.

Illustratively, the processor 182 may control a second driving mechanism to drive a functional device such as the functional device 15 to rotate, such as the processor 182 may control the second driving mechanism to drive the radiator 151, the receiver 152, the microphone 153, and the camera module 156. The projection optical module 157 rotates. The processor 182 may control the second driving mechanism to drive the functional device 15 to rotate in the circumferential direction of the main body 11, or the processor 182 may control the second driving mechanism to drive the functional device 15 to rotate in the circumference direction of the main body 11. In order to enable the functional device 15 to perform multi-directional signal transmission, the electronic device may perform 360-degree signal transmission, such as 360-degree acquisition of images, 360-degree projection, 360-degree transmission of sound signals, and 360-degree illumination. Wherein, the second driving mechanism may include a driving motor, a gear set, and the like. It should be noted that the second driving mechanism is not limited to the driving motor and the gear set, and the second driving mechanism may further include an electromagnet or the like.

In some embodiments, the processor 182 is configured to move the control functional device 15 in the circumferential direction of the main body 11 or to control the radial movement of the functional device 15 along the main body 11 in a preset scenario to implement 360 degree loop signal transmission of the functional device 15. The preset scene includes a conference scene, a music scene, and a monitoring scene.

It should be noted that the processor 182 may control the second driving mechanism to directly drive the functional device 15 to rotate, and may also control the rotation of the carrier 16 and the functional device 15 thereon, that is, the processor 182 may also control the rotation of the functional module 100.

When the functional device 15 includes the camera module 156, the processor 182 may control the camera module 156 to capture images for photographing. For example, when the user needs to take a photo, or needs face recognition (such as face recognition unlocking, face recognition verification payment), the processor 182 may start the camera module 156 by using a camera command, a face recognition command, and the like. It should be noted that when the lens direction of the camera module 156 is not aligned with the user's face or the desired shooting position, the processor 182 may control the camera module 156 to rotate to a desired position. Therefore, the embodiment of the present disclosure may realize the purpose of collecting images by controlling the camera module 156 by the processor 182, and is convenient for the user to use, thereby improving convenience.

When the functional device 15 includes the projection optical module 157, the processor 182 may control the projection optical module 157 to perform projection. For example, when the user needs to project the screen, the processor 157 may control the screen to be projected through the projection optical module 157 to a preset position for the user to view.

When the functional device 15 includes an acoustic device (such as the receiver 152, the microphone 153), the processor 182 may control the acoustic device to emit an acoustic signal or receive a sound signal. For example, when a user needs to make a multi-directional sound or an incoming sound, the processor 182 may control the acoustic device to rotate continuously transmit sound signals or receive sound signals toward different positions.

It should be noted that the manner in which the processor 182 controls the signal transmission of the function device 15 and the manner in which the control function device 15 rotates are not limited thereto and will not be exemplified herein. It will be understood that all of the signals involved in controlling the functional device 15 by the processor 182 and the rotation of the functional device 15 are within the scope of the present disclosure.

Exemplarily, the processor 182 may control a driving mechanism such as a third driving mechanism such as the functional device 15 to perform a telescopic movement, such as the processor 182 may control the third driving mechanism to drive the radiator 151, the receiver 152, the microphone 153, the camera module 156, the projection optical module 157, and the like perform telescopic movement. The processor 182 may control the third drive mechanism to drive the functional device 15 to move axially along the main body 11 to extend out of the main body 11 or into the main body 11, so that the functional device 15 may be housed in the main body 11 for protection, or protruded outside the main body 11 for signal transmission. The third drive mechanism may include a drive motor, a gear set, and the like. The third driving mechanism is not limited to the driving motor and the gear set, and the third driving mechanism may further include an electromagnet, an elastic member and the like.

The processor 182 may control the third driving mechanism to directly drive the functional device 15 to extend out of the main body 11 or to be housed in the main body 11 and may also control the carrier 16 and the functional device 15 thereon. The main body 11 is extended in the axial direction of the main body 11 or is received in the main body 11, that is, the processor 182 may also control the function module 100 to move out of the main body 11 along the axial direction of the main body 11 or be accommodated in the main body 11. The main body 11 includes the cylindrical end surface and a circular surface perpendicular to the central axis, the function module 100 is capable of moving out of and into the main body 10 via the circular end surface.

When the processor 182 controls the function module 100 to extend out of the main body 11 and protrudes out of the main body 11, the function module 100 may be controlled to be displaced relative to the main body 11, and the processor 182 may control the camera module 154 shooting, and processor 182 controls the projection optics module 157 to focus.

Illustratively, the processor 182 may control the drive member to drive the radiator 151 on the guide rail to move. The driving member may be a fourth driving mechanism, and the fourth driving mechanism may include a driving motor, a gear assembly and the like. The fourth drive mechanism is not limited to the drive motor and the gear set, and the fourth driving mechanism may further include an electromagnet, an elastic member, or the like.

As shown in FIG. 24, electronic device 10 may also include a memory 184 that may store data, such as data to be processed by the processor 182, or data that has been processed by the processor 182.

As shown in FIG. 23, the electronic device 10 may include a battery 19. The battery 19 may be disposed within the main body 11. The battery 19 may be provided in a rectangular parallelepiped structure or in a cylindrical structure. The battery 19 may be electrically connected to the main board 18, and the battery 19 may supply power to the electronic device 10.

In some embodiments, the main board 18 and the battery 19 may be disposed between the first end 111 and the second end 112. The main board 18 and the battery 19 may be arranged side by side in the main body 11.

To further illustrate the states of the flexible display of the present disclosure, further exemplification is provided below.

Figure 25:
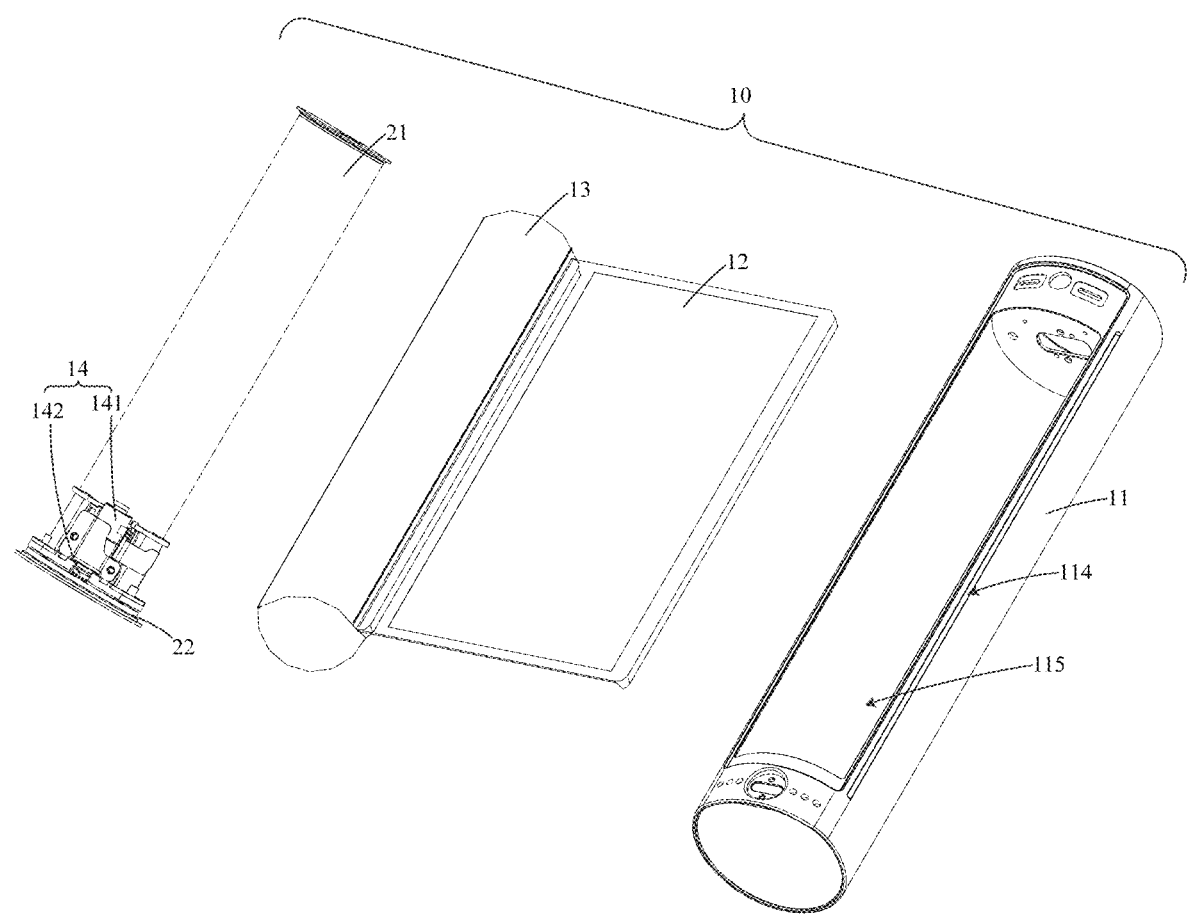
FIG. 25 illustrates a schematic diagram of a splitting of an electronic device according to an embodiment of the present disclosure.

Referring to FIG. 25, FIG. 25 illustrates a schematic diagram of a splitting of an electronic device according to an embodiment of the present disclosure. The electronic device 10 may further include an inner casing 21, and the inner casing 21 may be disposed inside the main body 11. The rotating shaft 13 may be a hollow rotating shaft, and the rotating shaft 13 may be sleeved around the inner casing 21, that is, the rotating shaft 13 is located between the inner casing 21 and the main body 11. The inner casing 21 may have a cylindrical structure. It should be noted that the shape of the inner casing 21 may be the same as or different from the shape of the main body 11.

The main board 18 and the battery 19 of the electronic device 10 may be disposed in the inner casing 21. An element such as a radiator 151 of the electronic device 10 may be disposed on the main body 11. Elements of the electronic device such as the receiver 152, the microphone 153, the camera module 156, the projection optical module 157, and the like may be disposed between the inner casing 21 and the end of the main body 11.

The electronic device 10 may also include a turntable 22 in driving connection with a drive mechanism, such as the first drive mechanism 14. Exemplarily, the first driving mechanism 14 may include a driving motor 141 and a gear set 142. The driving motor 141 and the gear set 142 are drivingly connected. The driving motor 141 may drive the gear set 142 to rotate. The gear set 142 may drive the rotating wheel 22 to rotate. The direction of rotation 22 is a rotation in the circumference direction of the main body 11. The rotating shaft 13 is sleeved on the periphery of the inner casing 21, and the rotating shaft 13 and the turntable 22 are fixedly connected, and the rotating shaft 13 may be rotated during the rotation of the turntable 22, so that the flexible screen 12 may be driven to be wound around the rotating shaft 13 or extended.

The inner casing 21 and the main body 11 are fixedly coupled to each other, the turntable 22 is rotatable relative to the main body 11 and the inner casing 21, and the rotating shaft 13 is rotatable relative to the main body 11 and the inner casing 21.

Thus, in the first embodiment, the flexible screen 12 may be wound around the rotating shaft 13 in the first state to be accommodated in the space formed between the main body 11 and the inner casing 21. In the second state, the flexible screen 12 may be extended relative to the rotating shaft 13, and the flexible screen 12 may be extended through the slit 114 to the outside of the main body 11 for display. In the first state, a portion of the flexible screen 12 may or may not be displayed through the transparent region 115.

It should be noted that FIG. 25 is only an example of the specific structure of the electronic device 10 in the embodiment of the present disclosure. The structure and driving mechanism of the electronic device 10 in the embodiment of the present disclosure are not limited thereto.

Figure 26:
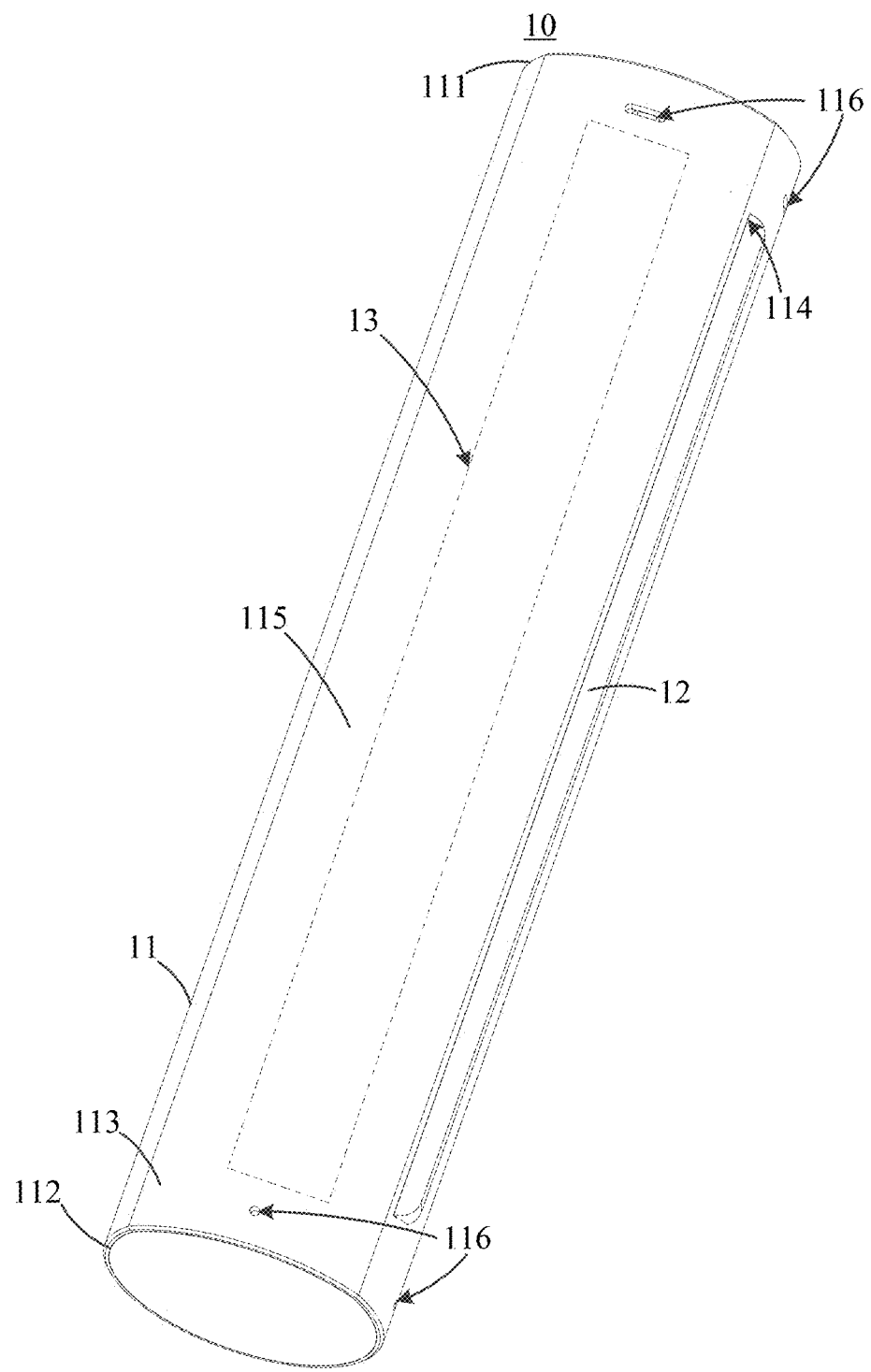
FIG. 26 illustrates a twelfth perspective view of an electronic device according to an embodiment of the present disclosure.
Figure 27:
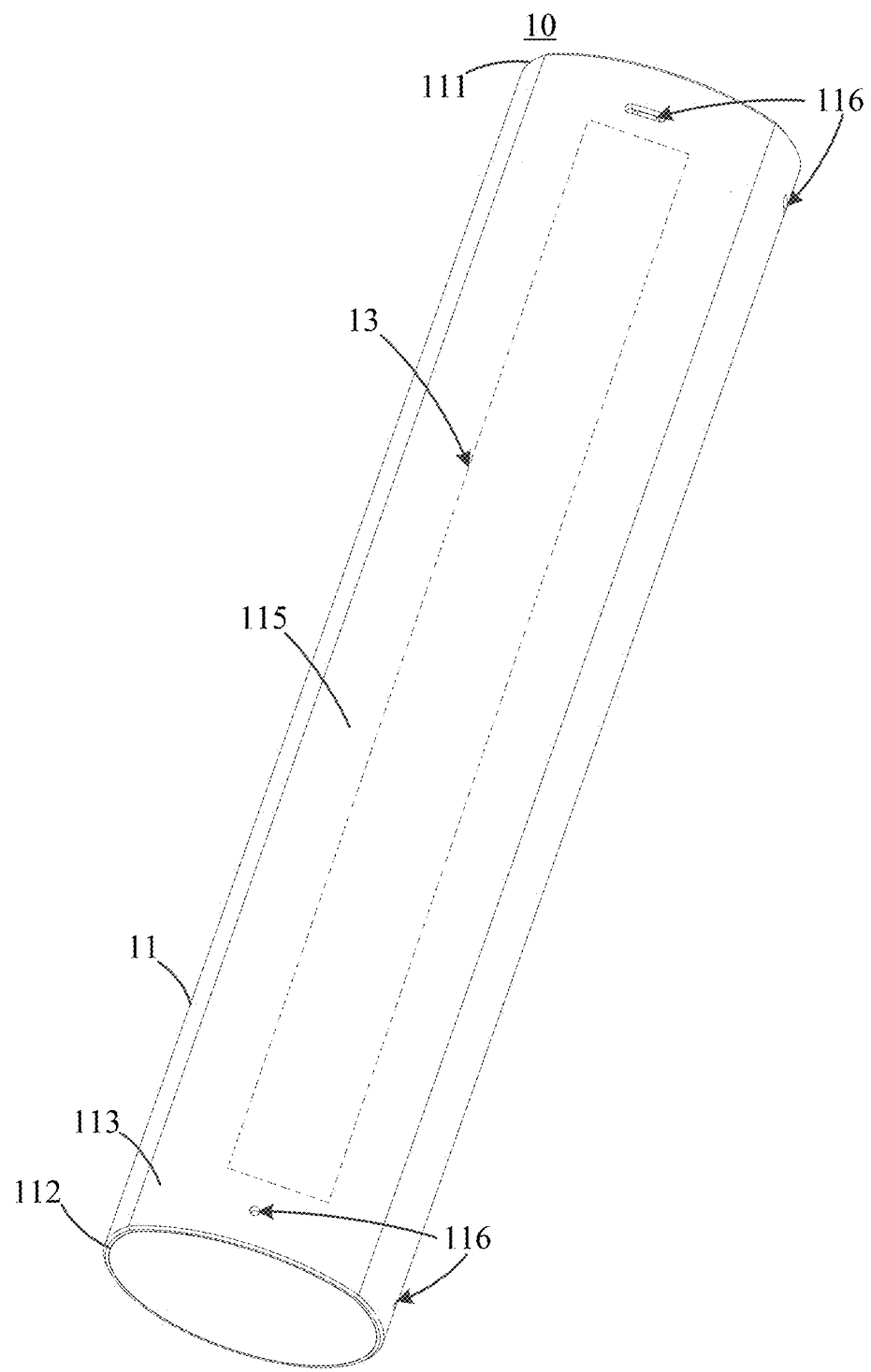
FIG. 27 illustrates a thirteenth perspective view of an electronic device according to an embodiment of the present disclosure.

FIG. 26 illustrates a twelfth perspective view of an electronic device according to an embodiment of the present disclosure. The screen 12 of the electronic device 10 is in a wound state, and the electronic device 10 is not displayed in its circumferential direction. FIG. 27 illustrates a thirteenth perspective view of the electronic device 10 according to the embodiment of the present disclosure. The electronic device 10 has a fixed screen 12, and the electronic device 10 does not have a display that can be deployed relative to the main body 11, thereby achieving appearance. The device structure of the electronic device 10 is implemented. The specific other component related structure is the same as the foregoing component structure, and details are not described in this embodiment.

The electronic device provided by the embodiment of the present disclosure is described in detail above. The principles and embodiments of the present disclosure are set forth in the specific examples, and the description of the above embodiments is only for the purpose of understanding the present disclosure. In the meantime, those skilled in the art will be able to change the specific embodiments and the scope of the disclosure according to the idea of the present disclosure. In the above, the content of the specification should not be construed as limiting the present disclosure.

What is claimed is:

1. An electronic device, comprising:
a main body being a reel structure, wherein the main body comprises a first end, a second end, and a first side portion, the first side portion is provided with a slit, and the slit has a strip shape and is formed between the first end and the second end;
a flexible screen, selectively in a first state wound inside the main body and a second state being released from the main body, wherein the flexible screen is capable of being reeled inside or released from the main body through the slit, the flexible screen comprises a display area and a non-display area, and in the first state, the display area is completely accommodated in the main body, and a part of the non-display area is exposed from the main body;
a rotating shaft disposed in the main body along an axial direction of the main body, wherein the rotating shaft is a hollow structure, the rotating shaft is rotatable relative to an outer surface of the main body, the rotation of the rotating shaft is configured to drive the flexible screen to reel, one end of the flexible screen is fixed on the rotating shaft, and the part of the flexible screen inside the main body is wound on the rotating shaft;
a turntable, fixedly connected to the rotating shaft, wherein the turntable is rotatable relative to the main body;
an inner casing, disposed inside and fixedly coupled to the main body, wherein the rotating shaft is configured to be sleeved around the inner casing, the turntable is rotatable relative to the inner casing, and a main board and a battery of the electronic device are disposed in the inner casing;
a first driving mechanism, comprising a driving motor and a gear set drivingly connected to each other, wherein the driving motor is configured to drive the gear set to rotate, and the gear set is configured to drive the turntable to rotate; and
a processor, configured to control the flexible screen to be changed between the first state and the second state in response to operation instructions applied on the main body or the flexible screen, wherein the operation instructions comprise a multi-finger operation, the processor is configured to control the flexible screen to be split into at least two sub-display areas according to the multi-finger operation, a number of fingers recognized in the multi-finger operation is equal to a number of the sub-display areas, and the at least two sub-display areas are arranged side by side in the axial direction of the main body, and the processor is configured to control the flexible screen to contract into the main body when a battery level of the electronic device is lower than a preset value.

2. The electronic device according to claim 1, wherein the operation instructions further comprise a sliding operation, and the processor is configured to control the flexible screen to move toward a preset direction according to the sliding operation.

3. The electronic device according to claim 2, wherein the processor is configured to control an exposed length of the flexible screen that is released from the main body according to a sliding distance of the sliding operation.

4. The electronic device according to claim 2, wherein the processor is configured to control a moving speed of the flexible screen according to a sliding force of the sliding operation.

5. The electronic device according to claim 1, wherein the operation instructions further comprise a click operation or a long press operation, and the processor is configured to control the flexible screen to move according to the click operation or the long press operation.

6. The electronic device according to claim 5, wherein the processor is configured to control a display ratio of the flexible screen according to a number of clicks in the click operation within a preset time.

7. The electronic device according to claim 5, wherein the processor is configured to control a display ratio of the flexible screen according to a press strength of the long press operation.

8. The electronic device according to claim 1, wherein the operation instructions further comprise another multi-finger operation, and the processor is configured to control moving of the flexible screen according to a number of fingers recognized in the another multi-finger operation.

9. The electronic device according to claim 1, wherein the electronic device further comprises a support element, the support element is disposed beneath the flexible screen to keep the flexible screen in an unfolded state after the flexible screen is released from the main body.

10. The electronic device according to claim 1, wherein at least two sub-display areas are wound to be reeled in or reeled out relative to the main body according to different operation instructions, the processor is configured to, according to the different operation instructions, control the at least two sub-display areas to display independently and control a split ratio between the at least two sub-display areas.

11. The electronic device of claim 1, wherein the electronic device further comprises at least one radiator disposed on an end of the main body to transmit radio frequency signals.

12. The electronic device according to claim 1, wherein the main body comprises a first end, the electronic device further comprises a charging module disposed at the first end, and the charging module comprises a charging interface or a wireless charging coil.

13. The electronic device according to claim 1, wherein the electronic device further comprises at least one function module, and the at least one function module is disposed at one end in a longitudinal direction of the main body, and configured to implement signal transmission from and/or to the electronic device.

14. The electronic device according to claim 13, wherein the function module comprises a camera module, a microphone, or a charging module.

15. An electronic device, comprising:
a main body being a reel structure, wherein the main body comprises a first end, a second end, and a first side portion, the first side portion is provided with a slit, and the slit has a strip shape and is formed between the first end and the second end;
a flexible screen, selectively in a first state wound inside the main body and a second state being released from the main body, wherein the flexible screen is capable of being reeled inside or released from the main body through the slit, and in the first state, a display area of the flexible screen is completely accommodated in the main body;
a rotating shaft disposed in the main body along an axial direction of the main body, wherein the rotating shaft is a hollow structure, the rotating shaft is rotatable relative to an outer surface of the main body, the rotation of the rotating shaft is configured to drive the flexible screen to reel, one end of the flexible screen is fixed on the rotating shaft, and a part of the flexible screen inside the main body is wound on the rotating shaft;
a turntable, fixedly connected to the rotating shaft, wherein the turntable is rotatable relative to the main body;
an inner casing, disposed inside and fixedly coupled to the main body, wherein the rotating shaft is configured to be sleeved around the inner casing, the turntable is rotatable relative to the inner casing, and a main board and a battery of the electronic device are disposed in the inner casing;
a first driving mechanism, comprising a driving motor and a gear set drivingly connected to each other, wherein the driving motor is configured to drive the gear set to rotate, and the gear set is configured to drive the turntable to rotate;
a function module, disposed at one end in a longitudinal direction of the main body to implement signal transmission from and/or to the electronic device; and
a processor configured to control the function module to move along a circumferential direction of the main body to implement a 360-degree circular signal transmission and control the flexible screen to be changed between the first state and the second state in response to operation instructions applied on the flexible screen, wherein the operation instructions comprise a multi-finger operation, the processor is configured to control the flexible screen to be split into at least two sub-display areas according to the multi-finger operation, a number of fingers recognized in the multi-finger operation is equal to a number of the sub-display areas, and wherein the processor is configured to control the flexible screen to contract into the main body when a battery level of the electronic device is lower than a preset value.

16. The electronic device according to claim 15, wherein the electronic device comprises a carrier, the function module is disposed on the carrier, the carrier is configured to carry the function module out of or into the main body, and a moving direction of the function module is along an axis of the main body.

17. The electronic device according to claim 15, wherein the function module comprises a camera module, a microphone, or a charging module.

18. An electronic device, comprising:
a main body comprising a cylindrical surface, wherein a slit is defined in the cylindrical surface, the slit is extended along a central axis of the cylindrical surface, wherein the main body comprises a first end and a charging module is disposed at the first end, the charging module comprises a wireless charging coil;
a flexible screen being configured to reel inside and release from the main body via the slit, wherein the flexible screen comprises a display area and a non-display area, and in a first state, the display area is completely accommodated in the main body, and a part of the non-display area is exposed from the main body;
a rotating shaft disposed in the main body along an axial direction of the main body, wherein the rotating shaft is rotatable relative to an outer surface of the main body, the rotation of the rotating shaft is configured to drive the flexible screen to reel, one end of the flexible screen is fixed on the rotating shaft, and the part of the flexible screen inside the main body is wound on the rotating shaft; and
a processor, configured to control the flexible screen to be changed between the first state and a second state in response to operation instructions applied on the flexible screen, wherein the operation instructions comprise a multi-finger operation, the processor is configured to control the flexible screen to be split into at least two sub-display areas according to the multi-finger operation, a number of fingers recognized in the multi-finger operation is equal to a number of the sub-display areas, and the processor is configured to control the flexible screen to contract into the main body when a battery level of the electronic device is lower than a preset value.

19. The electronic device of claim 18, wherein the electronic device comprises a function module, the cylindrical surface comprises a circular end surface perpendicular to the central axis, and the function module configured to move out of and into the main body via the circular end surface.

\* \* \* \* \*